(12) United States Patent
Rupp et al.

(10) Patent No.: US 11,084,447 B2
(45) Date of Patent: Aug. 10, 2021

(54) UNIVERSAL SEAT-MOUNTED AIRBAG

(71) Applicant: NIO USA, Inc., San Jose, CA (US)

(72) Inventors: Jeffrey D. Rupp, San Jose, CA (US); Samantha L. Schoell, San Jose, CA (US); Jane Williams, San Jose, CA (US); Colin J. Stevens, San Jose, CA (US); Teh Feng Fang, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 120 days.

(21) Appl. No.: 16/533,557

(22) Filed: Aug. 6, 2019

(65) Prior Publication Data

US 2021/0039578 A1 Feb. 11, 2021

(51) Int. Cl.
  *B60R 21/207* (2006.01)
  *B60R 21/231* (2011.01)
  *B60R 21/2338* (2011.01)

(52) U.S. Cl.
  CPC ........ *B60R 21/207* (2013.01); *B60R 21/2338* (2013.01); *B60R 21/23138* (2013.01); *B60R 2021/23146* (2013.01)

(58) Field of Classification Search
  None
  See application file for complete search history.

(56) References Cited

U.S. PATENT DOCUMENTS

| | | | |
|---|---|---|---|
| 4,825,469 A | 5/1989 | Kincheloe | |
| 2020/0114857 A1* | 4/2020 | Jaradi | B60R 21/207 |
| 2020/0164828 A1* | 5/2020 | Park | B60R 21/233 |
| 2020/0317154 A1* | 10/2020 | Choi | B60R 21/207 |

FOREIGN PATENT DOCUMENTS

WO  WO-2020130427 A1 * 6/2020 ........... B60R 21/233

OTHER PUBLICATIONS

Kitagawa et al., "Occupant Kinematics in Simulated Autonomous Driving Vehicle Collisions: Influence of Seating Position, Direction and Angle." Stapp Car Crash Journal, Nov. 2017, vol. 61, pp. 101-155.
"Autoliv Annual Report 2017," Autoliv, executed Feb. 2018, 135 pages.
"Future Technologies, Autoliv Life Cell Airbag," Autoliv Inc., 2019, https://www.autoliv.com/products/passive-safety/future-technologies, 4 pages.

(Continued)

*Primary Examiner* — Faye M Fleming
(74) *Attorney, Agent, or Firm* — Sheridan Ross P.C.

(57) ABSTRACT

A "universal" airbag system according to embodiments of the present disclosure provides for occupant protection in both conventional and unconventional seating orientations (rotated, reclined, and lying positions), when impacted in various directions. The universal airbag system features a seat mounted airbag which may be used with a seat-integrated seatbelt. The material may be selected, constructed, and attached such that it does not fail or tear under application-specific loading conditions, is strong enough to capture the occupant, has the elongation/expansion properties for a flexible yet stable shape with excursion limiting functionality, and is optionally inflatable.

19 Claims, 10 Drawing Sheets

(56) References Cited

OTHER PUBLICATIONS

"Autoliv Life Cell Airbag—Future Technology Introduced," Autoliv Inc., Jan. 17, 2018, retrieved from https://www.youtube.com/watch?v=rMfQvMnp1UI, 2 pages.

"Carkoon® Safety Car Seat Images," Carkoon, 2015, retrieved from http://carkoon.com/car-seat-image-gallery/carkoon-safety-car-seat-images/, 1 page.

"CarkoonCarseat," Airbag Deployment, Carkoon® Apr. 19, 2012, CH9 News, video retrieved from https://www.youtube.com/watch?v=x5nk50T1A9g, 1 page.

\* cited by examiner

UNIVERSAL SEAT-MOUNTED AIRBAG

FIELD

The present disclosure is generally directed to vehicle systems, and more particularly to vehicle airbag systems.

BACKGROUND

Current seats and restraints including seat belts, airbags, and other deformable surfaces were typically designed for automobile occupants in a forward-facing direction. In the future, it is envisioned that autonomous driving vehicles will enable the driver and occupants to occupy themselves with other activities and let the vehicle manage driving by itself. In these cases, it may be desirable for a seat to be provided in a reclined or rotated position, or for an occupant to recline or rotate an adjustable seat, such that the occupant is no longer in a forward-facing direction.

In the event of a collision, this rotated or reclined position may be disadvantageous for managing the occupant motion or contact with other portions of the vehicle including other surfaces or occupants. Previous studies of angled seating positions, such as Kitagawa, Yuichi, et al. "Occupant Kinematics in Simulated Autonomous Driving Vehicle Collisions: Influence of Seating Position, Direction and Angle." *Stapp car crash journal* 61 (2017): 101-155, which is incorporated by reference herein in its entirety, have shown increased occupant excursion when a 3-point belt loses engagement with the shoulder. In addition, reclined seating positions resulted in more occupant excursion for the rear-facing occupant.

The Autoliv Life Cell Airbag being developed by Autoliv Inc. intends to protect the occupant in any seating orientation or angle. Due to the rotation of the seats, the airbag is seat mounted and deploys around the occupant to provide a protective cocoon-like environment which protects the occupant head and torso in the event of a crash. The AutoLiv Life Cell Airbag provides a protective perimeter when combined with a driver or passenger airbag and a seat belt.

Similar to the Autoliv Life Cell Airbag, the Carkoon® developed by Cool Technologies is a cocoon airbag built within an infant car seat. The airbag is designed to provide impact protection in conjunction with the seat belt and shield a child within the car seat from flying objects in the event of a crash, while also providing fire protection. The airbag never makes contact with the child as it surrounds the open surface of the car seat and therefore offers limited containment of the occupant. The deep bolsters of the car seat in addition to the seat belt are the main contributors in limiting occupant excursion.

In at least one embodiment, the Carkoon® includes three fixed stays or ribs positioned around the head of the occupant which are used during deployment. The fixed stays help maintain the shape of the airbag around the occupant head.

Similarly, other protective airbags include wearable airbags developed for use on bicycles and motorcycles which provide body coverage to minimize injuries. U.S. Pat. No. 4,825,469, which is incorporated herein by reference in its entirety, discloses such a wearable airbag.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

A "universal" airbag system according to embodiments of the present disclosure provides for occupant protection in all conventional and unconventional seating orientations (rotated, reclined, and lying positions), from impacts in all directions. The universal airbag system features a seat mounted airbag which may be used with a seat-integrated seatbelt. The material used in the universal airbag system may be selected, constructed, and attached such that it does not fail or tear under application-specific loading conditions, is strong enough to capture the occupant, has the elongation/expansion properties for a flexible yet stable shape with excursion limiting functionality, and is optionally inflatable.

Known airbag systems provide a cushion in a particular location, with coverage of the head and/or torso that is targeted for a crash impact in a very narrow direction of impact relative to a forward-facing seat. Some embodiments of the present disclosure comprise improvements to a cocoon-type airbag such as the Autoliv Life Cell Airbag. Some embodiments of the present disclosure include a tether-tensioning system to provide more occupant containment, thus reducing the severity of crash-related injuries. The addition of the tether system to the cocoon airbag will allow for better control of occupant head, torso, arms, and legs which are not typically controlled by airbags, seatbelts, or seats. Occupant containment can be achieved subtly, for example by including or providing an additional tether on an outer edge of an airbag to provide additional resistance, or can be achieved more dramatically by providing different levels of closure of a cocoon-type airbag to enclose the entire body. A tether-tensioning system as disclosed herein can extend along all or part of a perimeter of an airbag, and may feature additional inner tethers or drawstrings. The tether-tensioning system can allow for ride-down of the occupant, or remove slack in one or more airbag panels to limit occupant excursion.

The focus of the universal airbag systems described herein is on occupant containment or, in other words, limiting occupant excursion from the occupant's seat. In some embodiments, a universal airbag system according to the present disclosure would provide protection for unbelted occupants without the need for additional restraints. Previously developed cocoon airbags are dependent on 3-point belts and/or driver/passenger airbags and/or large seat bolsters to limit occupant excursion. For example, the Autoliv Life Cell Airbag does not feature a tether-tensioning system to provide better occupant containment as per embodiments of the present disclosure.

Figure 1:
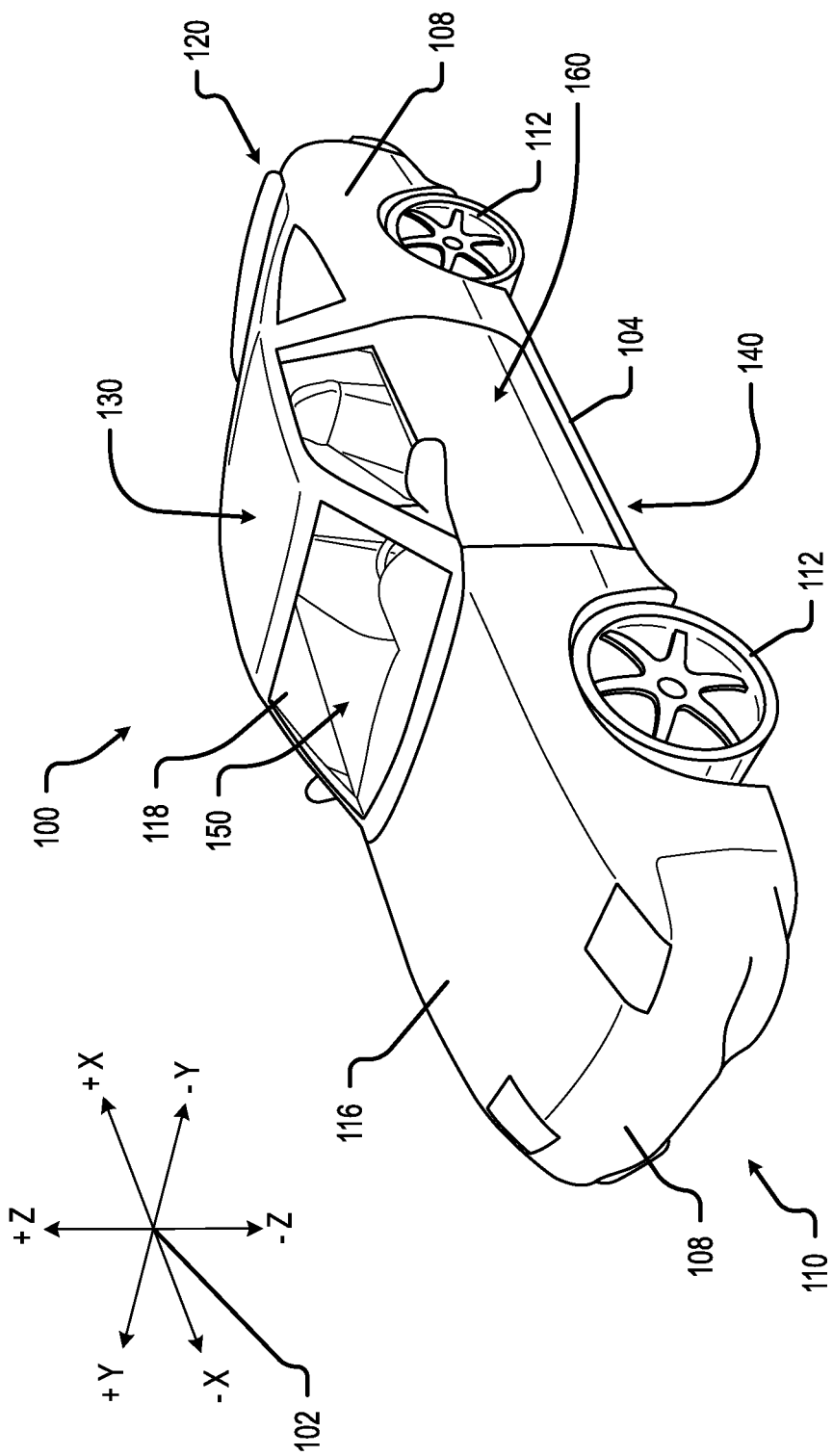
FIG. 1 shows a vehicle in accordance with embodiments of the present disclosure.

Turning now to the figures, FIG. 1 shows a perspective view of a vehicle 100 in accordance with embodiments of the present disclosure. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, an electric vehicle or a gas-powered vehicle. Where the vehicle 100 is an electric vehicle, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is a gas-powered vehicle, the vehicle 100 may comprise a gas-powered engine and associated components in the front compartment (under the vehicle hood 116), which engine may be configured to drive either or both of the front wheels 112 and the rear wheels 112. In some embodiments where the vehicle 100 is gas-powered, the gas-powered engine and associated components may be located in a rear compartment of the vehicle 100, leaving the front compartment available for storage or trunk space or for other uses. In some embodiments, the vehicle 100 may be, in addition to a battery-powered electric vehicle or a gas-powered vehicle, a hybrid electric vehicle, a diesel-powered vehicle, or a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

Figure 2:
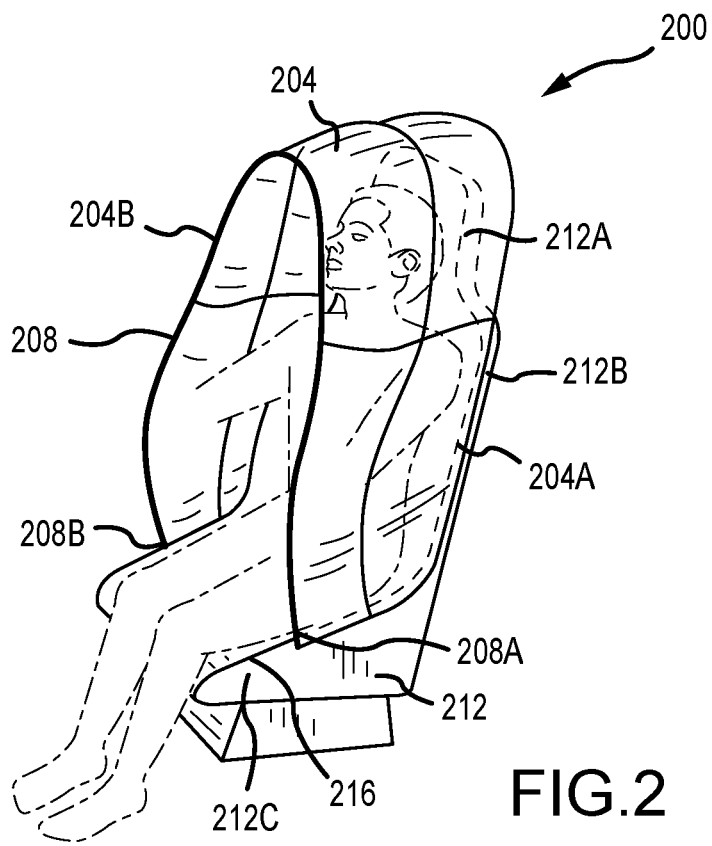
FIG. 2 shows a seat-mounted airbag in accordance with at least some embodiments of the present disclosure.

With reference now to FIG. 2, a universal seat-mounted airbag system 200 (shown here in an inflated position) comprises an inflatable cocoon-type airbag 204 that, prior to inflation, is stored in a portion of a perimeter 216 of a seat 212. The seat 212 comprises a headrest portion 212A, a backrest portion 212B, and a seat pan portion 212C. Prior to inflation, the airbag 204 may be stored, for example, in a tube-like container that extends along at least a portion of one side of the seat pan portion 212C, up a corresponding side of the backrest portion 212B, up one side of the headrest portion 212A, across the top of the headrest portion 212A, down another side of the headrest portion 212A, down a corresponding side of the backrest portion 212B, and along at least a portion of another side of the seat pan portion 212C. The stored airbag 204 may be positioned inside the perimeter 216 of the seat 212, underneath a tear seam configured to open, break, separate, or otherwise give way when the airbag 204 is deployed.

The airbag 204 comprises a first edge 204A that is secured or otherwise connected to the seat 212 along the perimeter 216. When the airbag 204 inflates, the airbag 204 remains secured or otherwise connected to the seat 212 along the first or connected edge 204A. A second edge 204B of the airbag 204, however, is free (e.g., not connected along the perimeter 216 of the seat 212). When the airbag 204 inflates, the second or free edge 204B of the airbag 204 deploys away from the first or connected edge 204A.

The system 200 also comprises a tether 208 having a first end 208A secured to one side of the seat pan portion 212C, and a second end 208B secured to another side of the seat pan portion 212C. The tether 208 is connected or otherwise attached to the airbag 204 along the second or free edge 204B. In some embodiments, the tether 208 may be continuously connected to the second or free edge 204B. For example, the airbag 204 may comprise a tube or casing along the second or free edge 204B, in which the length of the tether 208 between the first end 208A and the second end 208B is enclosed. In other embodiments, the tether 208 may be connected at distributed points along the second or free edge 204B. For example, loops may be secured at intervals along the second or free edge 204B, and the tether 208 may be strung through the loops.

The tether 208 may comprise, for example, a cord, a rope, or a strap. In some embodiments, where use of a cord or rope may be potentially harmful (e.g., due to edge loading along a narrow line of contact), a wider strap providing a greater area over which forces may be distributed may be preferable. The tether 208 may also comprise a mesh or other non-linear construction, provided that the tether 208 may be secured along or proximate to the second or free edge 204B of the airbag 204.

When the airbag 204 is fully deployed, the tether 208 provides static tension along the second or free edge 204B. This helps the airbag 204 to remain in position and limits deflection of the airbag as a result of, for example, an occupant of the seat 212 impacting an interior side of the airbag 204. The provision of static tension along the second or free edge 204B of the airbag 204 by the tether 208 may also keep the airbag 204 closer to the occupant of the seat 212, which beneficially minimizes the motion of the occupant within the inflated airbag 204. Further still, the tension provided by the tether 208 along the second or free edge 204B helps to "capture" the occupant within the protective volume defined at least in part by the airbag 204, by preventing the second or free edge 204B of the airbag from simply moving out of the way when impacted by the occupant.

In some embodiments, the airbag 204 may be configured with one or more inflation compartments, between which the flow of air or other gas is entirely or somewhat restricted so that deflation of one compartment will not result in the immediate deflation of another compartment. Also in some embodiments, the airbag 204 may be configured to inflate along a specific inflation path and/or may be folded in a specific manner to control the manner in which the airbag 204 inflates. Controlled inflation/deployment may beneficially ensure that the airbag 204 does not get tangled up in itself during inflation, and may also beneficially ensure that certain portions of the airbag 204 (e.g., portions more likely to be impacted by an occupant of the seat 212 than other portions) are inflated first. In some embodiments, the airbag 204 may be configured to inflate in a way that pushes one or both of an occupants' arms forward and inward (to the extent the arm or arms are not already forward and inward), so as to position the arm(s) within the protective envelope of the airbag 204.

The universal seat-mounted airbag system 200, as with all other embodiments of the present disclosure, may comprise any airbag system components known in the art, including one or more sensors for detecting a collision or other triggering event, one or more inflators for rapidly inflating the airbag 204 (whether pyrotechnically or otherwise), and one or more diagnostic sensors or other diagnostic equipment for evaluating whether the airbag system 200 is functioning properly. The airbag system 200 may be configured to deploy upon receipt of a signal from one or more vehicle crash sensors or motion sensors that are not specifically part of the airbag system 200, and may further be configured to deploy in different ways depending on detected information from one or more sensors within the airbag system 200 and/or one or more vehicle crash sensors or motion sensors.

Turning now to FIG. 3, a universal seat-mounted airbag system 300 according to embodiments of the present disclosure is substantially similar to the airbag system 200 described above with respect to FIG. 3, except that the airbag 304 of the airbag system 300 is configured to deploy over the head of an occupant of the seat 212. Additionally, the tether 308 is connected to or proximate the perimeter 216 of the seat 212 via one or more retraction mechanisms 316, and the tether 308 functions as a drawstring. In other words, during or after inflation of the airbag 304, the one or more retraction mechanisms 316 begin to retract the tether 308, thus shortening the length of the tether 308 that is engaged with the second or free end of the airbag 304 and pulling closed the opening 320 formed by the second or free edge of the airbag 304. As with the tether 208, the tether 308 may be engaged with the free edge of the airbag 304 by way of a casing or tube in which a length of the tether 308 is enclosed, or by way of being threaded through loops secured at intervals to the free edge, or in any other suitable manner. Reducing the area of the opening 320 formed by the airbag 304 beneficially helps to prevent the occupant from sliding out of or otherwise exiting the protective enclosure of the airbag 304, while also helping to ensure that the airbag 304 more fully encloses and protects the occupant of the seat 212.

Figure 3:
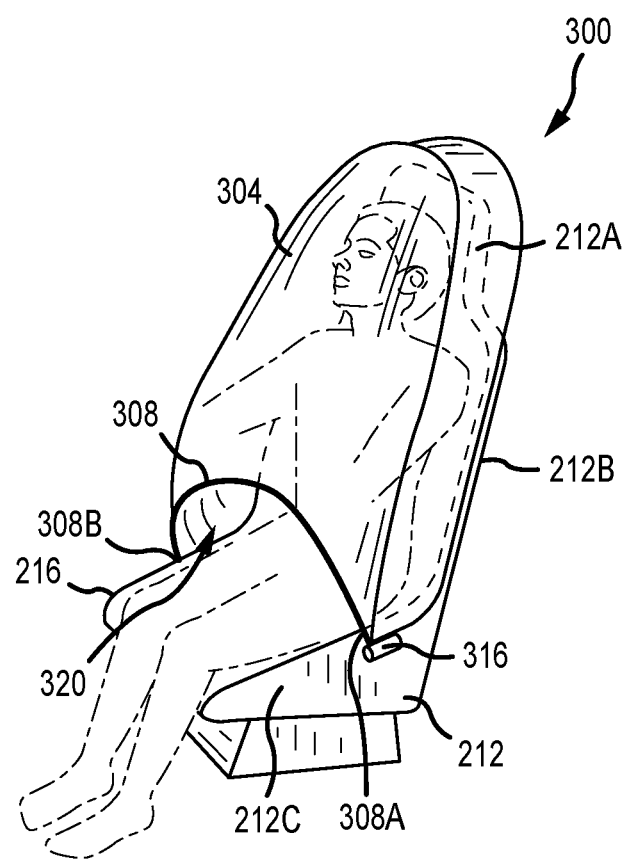
FIG. 3 shows another seat-mounted airbag in accordance with at least some embodiments of the present disclosure.

As may be appreciated from the foregoing disclosure and FIG. 3, the airbag 304 substantially encloses the head and torso of an occupant of the seat 212, thus capturing the occupant and preventing significant movement of the occupant in any forward or sideways direction (relative to the seat 212). The seat 212 itself prevents movement of the occupant in a backward (e.g., into the seat 212) direction.

Given that many of the universal seat-mounted airbag systems disclosed herein substantially or completely enclose the head of an occupant, any of the airbags disclosed herein may comprise one or more air-permeable sections to allow air to flow into and out of an enclosure formed by the airbag and prevent suffocation of the occupant by the airbag. The air-permeable sections may comprise, for example, non-inflated sections with holes provided therein, or that are made of air-permeable fabric.

In addition to providing enhanced protection for an occupant of a seat 212 that can be reclined, the airbag system 300 is particularly well-suited for use with a seat that can be rotated. For example, if the seat 212 is rotatably installed in a vehicle 100 and has been rotated such that an occupant thereof is facing sideways or only partially forward, and the vehicle 100 suffers a frontal collision, the airbag 304 will substantially limit forward movement of the occupant, thus helping to protect the occupant from injury.

Figure 4:
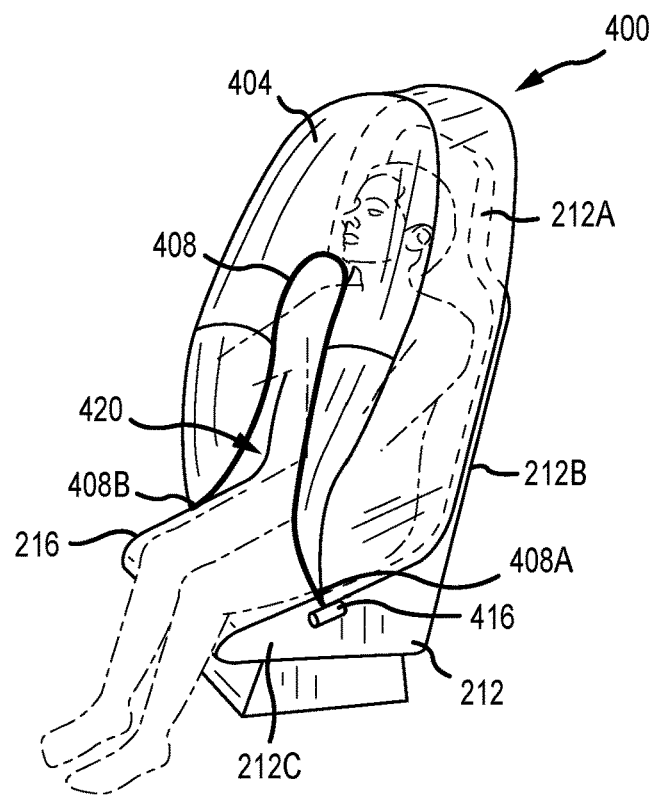
FIG. 4 shows another seat-mounted airbag in accordance with at least some embodiments of the present disclosure.

FIG. 4 shows a universal seat-mounted airbag system 400 substantially similar to the airbag system 200 of FIG. 2, except that the tether 408 of the system 400, like the tether 308 of the system 300, is a drawstring. More specifically, the ends 408A and 408B of the tether 408 are attached to or proximate the perimeter 216 of the seat 212 on the sides of seat pan portion 212C via one or more retraction mechanisms 416 that, during or after deployment of the airbag 404, begin to retract the tether 408, thus shortening the tether 408 and drawing closed the opening 420 formed by the second or free edge of the airbag 404.

In some embodiments of the airbag system 300 and 400, the retraction mechanisms 316 and 416 may be configured to vary the amount by which the tethers 308 and 408, respectively, are retracted based on available information. The available information may comprise, for example, information from one or more sensors of a vehicle 100 in which the system 300 or 400 installed (e.g., sensors associated with an Occupant Classification System installed in the vehicle 100). When available information indicates that a lightweight occupant is in the seat 212, for example, the retraction mechanisms 316 or 416 may retract the tether 308 or 408, respectively, more than if the available information indicates that a heavy occupant is in the seat 212.

The timing of retraction of the tethers 308 and 408 may also be varied based on available information such as that described above. If a lightweight occupant is in the seat 212, for example, the retraction may begin earlier than if a heavier occupant is in the seat 212 (based on the assumption that a lightweight occupant will be smaller than a heavier occupant, and therefore the airbag 304 or 404 will need less time to deploy past the occupant).

Figure 5:
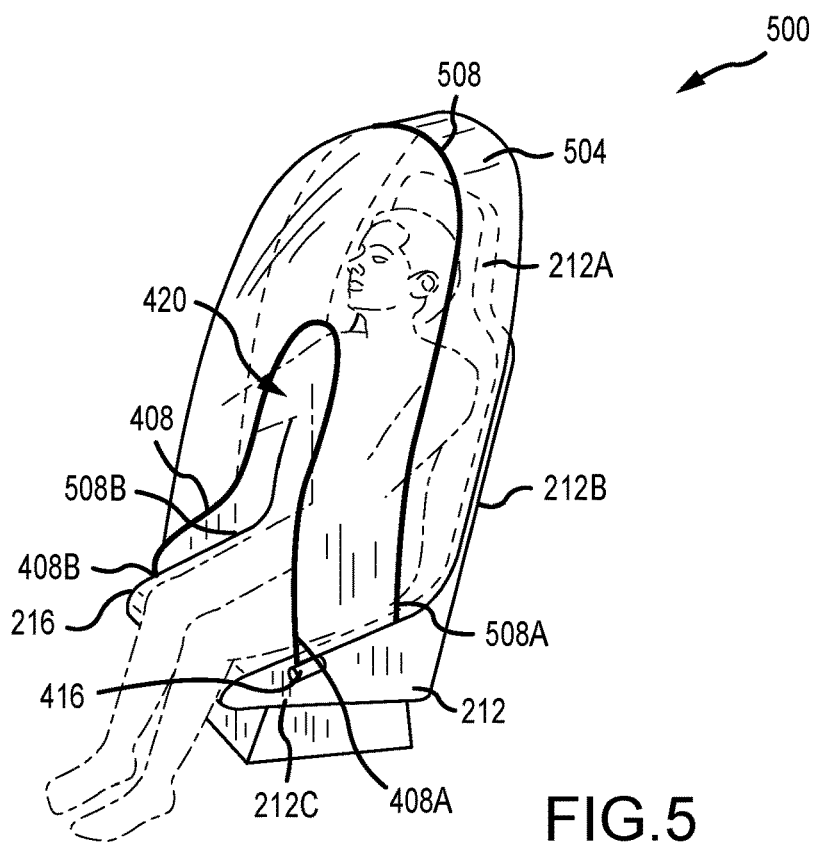
FIG. 5 shows another seat-mounted airbag in accordance with at least some embodiments of the present disclosure.

With reference now to FIG. 5, a universal seat-mounted airbag system 500 comprises many of the same elements as the airbag system 400. The airbag 504 is substantially similar to the airbag 404, except a second or inner tether 508 is attached, connected, or otherwise engaged with the airbag 504. More specifically, the second or inner tether 508 is engaged with the airbag 504 along a circumference of the airbag 504, approximately (but not necessarily) halfway in between the tether 408 (which may be referred to as an outer tether) and the portion of the edge of the airbag 504 that is secured to the backrest portion 212B of the seat 212.

As with the first or outer tether 408, the second or inner tether 508 has a first end 508A secured to or proximate a first side of the pan portion 212C of the seat 212, and a second end 508B secured to or proximate a second side of the pan portion 212C of the seat 212 opposite the first side. The second or inner tether 508 may be substantially enclosed within a tube or casing that extends along the circumference of the airbag 504, or may be threaded through a plurality of loops attached at intervals to the circumference of the airbag 504, or may be engaged with the airbag 504 via any other manner suitable to hold the second tether 508 in substantially the same position relative to the airbag 504.

Use of a second tether 508 in the universal seat-mounted airbag system 500 beneficially helps to enclose an occupant of the seat 212 within the airbag 504 and to control the overall volume encompassed by the airbag 504. This, in turn, helps to reduce movement of the occupant within the airbag 504 and thus to reduce injuries to the occupant.

In some embodiments, the second tether 508 may function as a drawstring, like the tethers 308 and 408. In such embodiments, the second tether 508 is attached or otherwise connected to or proximate the sides of the pan portion 212C of the seat 212 via one or more retraction mechanisms similar or identical to the retraction mechanism 316 and 416.

Figure 6A:
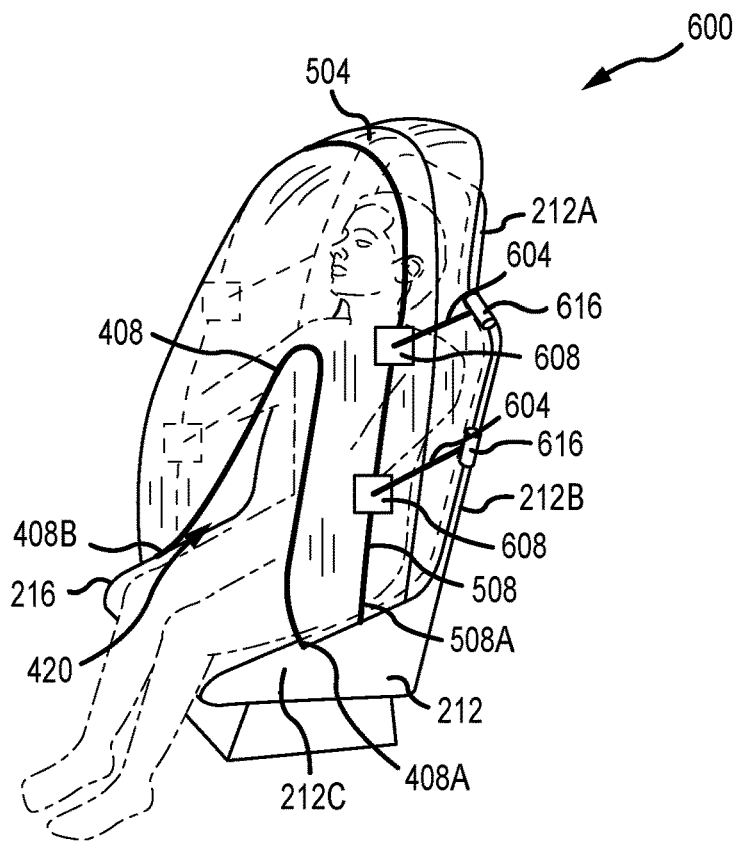
FIG. 6A shows another seat-mounted airbag in a first configuration in accordance with at least some embodiments of the present disclosure.
Figure 6B:
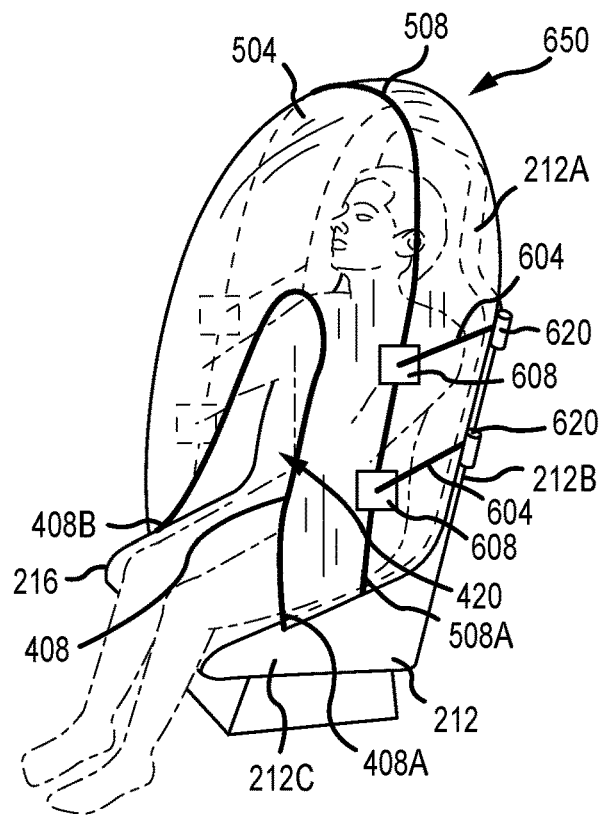
FIG. 6B shows the seat-mounted airbag of FIG. 6A in a second configuration in accordance with at least some embodiments of the present disclosure.

FIGS. 6A and 6B disclose alternative universal seat-mounted airbag systems 600 and 650, respectively, both of which include many of the same components as the universal seat-mounted airbag system 500 described above with respect to FIG. 5. In these embodiments, however, a plurality of tether straps 604 are secured, on one end, to or proximate the perimeter 216 of the seat 212, and on the other end to the airbag 504 or the second tether 508, in either case via a force-distributing connection 608 configured to distribute the tension force exerted by the tether straps 604 on the airbag 504 or the second tether 508 over a larger area than would otherwise be possible if the tether strap were simply secured directly to the airbag 504 or the second tether 508.

The tether straps 604 may be manufactured from the same material or materials as the tethers 408 and 508.

In the system 600 of FIG. 6A, each of the tether straps 604 is attached to or proximate the perimeter 216 of the seat 212 via a retraction mechanism 616 that retracts, at least in part, the tether straps 604 once they have been fully deployed. In some embodiments, the retraction of the tether straps 604 may begin or be triggered by retraction of the tether 408 and/or of the tether 508 (when the tether 508 is configured to function as a drawstring). In other embodiments, the tether straps 604 may be configured to begin retracting immediately after reaching a predetermined length. Retraction of the tether straps 604 removes slack from the panels of the airbag 504 and helps to lessen occupant excursion.

In the system 650 of FIG. 6B, each of the tether straps 604 is attached to or proximate the perimeter 216 of the seat 212 via an extension mechanism 620 that allows the strap 604 to quickly deploy to an initial, relatively short length and then imposes resistance on the strap 604 to slow the further extension thereof, thus creating a "ridedown" effect. In other words, once the strap 604 has deployed to an initial, relatively short length, the extension mechanism 620 may continue to pay out the strap, but at a slower rate that may or may not be dependent on the tension exerted on the strap 604. Thus, the straps 604 in the system 650 are ultimately longer than they were after the initial deployment thereof. The quick initial deployment of the straps 604 ensures that the straps 604 do not hinder the deployment of the airbag 504, while slowing the further extension of the straps 604 helps to slow occupant movement resulting from a collision or other airbag-triggering event. Moreover, the straps 604 may beneficially allow deceleration of the occupant to occur over a longer period of time, thus reducing the forces imposed on the occupant as a result of such deceleration and so reducing the risk of injury.

In some embodiments of the universal seat-mounted airbag systems 600 and 650, the first edge of the airbag 504 (i.e., the edge closest to the perimeter 216 of the seat 212) may not be secured to the seat 212, or may be detachably secured to the seat 212. In such embodiments, the airbag 504 may deploy around and enclose the occupant (including by retraction of the tether 408 to prevent the occupant from exiting the protective enclosure of the airbag 504 through the opening 420 formed by the free edge of the airbag 504). The airbag 504 may then move with the occupant a limited distance in the direction of the collision, either as the straps 604 deploy to an initial longer length and then retract to a shorter length in the system 600 (thus drawing the airbag 504 and the occupant back toward the seat 212), or as the straps 604 deploy to an initial shorter length and then continue to extend under resistance in the system 650 (thus slowing and eventually stopping the airbag 504 and the occupant before the occupant has traveled far enough to impact other objects within the vehicle 100).

Embodiments of a universal seat-mounted airbag system described above are, generally speaking, seatbelt agnostic. The universal seat-mounted airbag system 700 shown in FIGS. 7A and 7B, however, utilizes a seatbelt 712 as a tether for the purpose of drawing the airbags 704 and 708 of the system 700 together to at least partially enclose an occupant of the seat 212.

The system 700, then, comprises a seat 212, with a first airbag 704 positioned along a portion of the perimeter 216 of the seat 212 on one side of the seat 212, and a second airbag 708 positioned along a portion of the perimeter 216 of the seat 212 on an opposite side of the seat 212. A seatbelt 712 comprises a lap belt 712A having a first end 720A and a second end 720B, and a sash 712B having a third end 720C. In some embodiments, the lap belt 712A and sash 712B are portions of a single, continuous seatbelt 712, in which embodiments a buckle or other device is used to introduce a bend in the seatbelt 712 that separates the lap belt portion 712A from the sash portion 712B.

Conventional belt (lap and sash) systems utilize 4 elements: (1) an outer lap anchor to seat lower structure; (2) an inner lap anchor to seat lower structure; (3) an upper sash anchor to either seat upper structure or vehicle "Body in White" (BiW); and (4) a belt retractor (location dependent on item 3)). In the system 700, which utilizes the seatbelt 712 as a tether, all four of these elements are utilized.

Figure 7A:
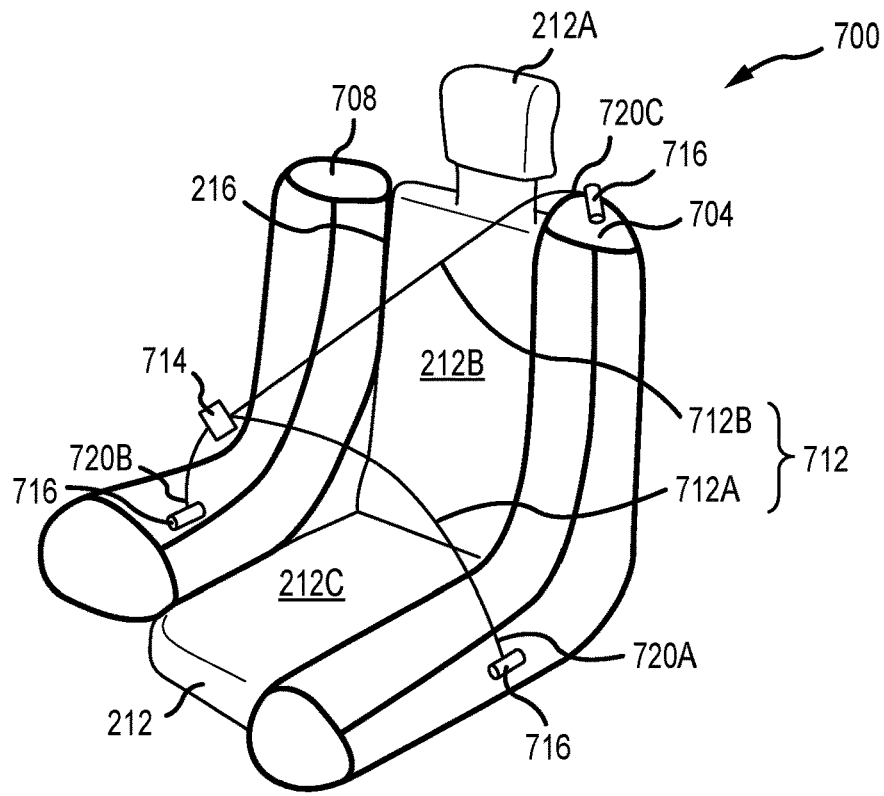
FIG. 7A shows another seat-mounted airbag in a first configuration in accordance with at least some embodiments of the present disclosure.
Figure 7B:
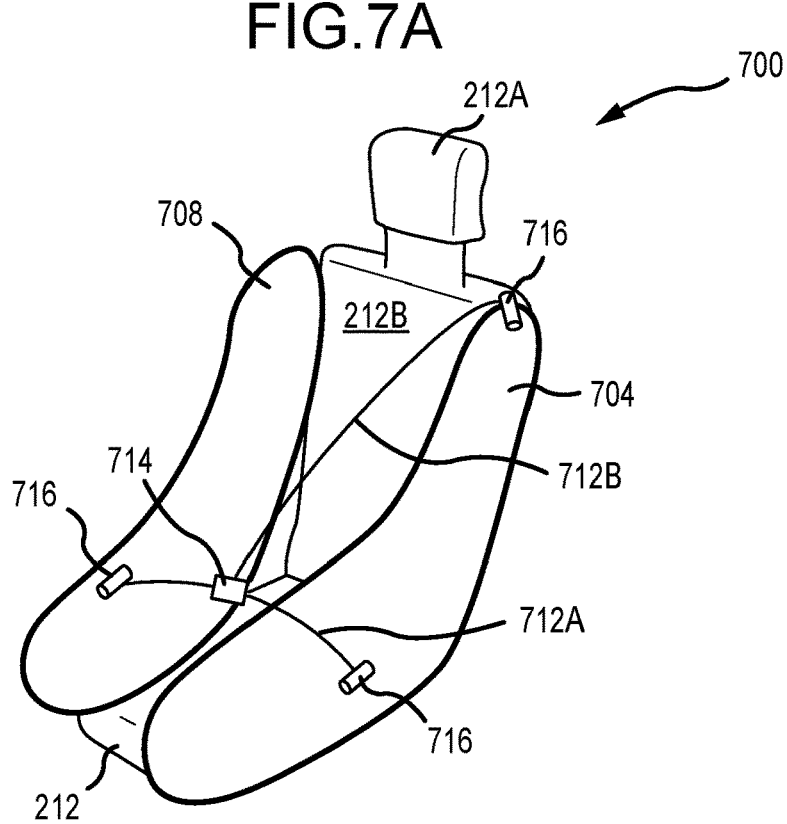
FIG. 7B shows the seat-mounted airbag of FIG. 7A in a second configuration in accordance with at least some embodiments of the present disclosure.

More specifically, in the system 700 the seatbelt 712 is anchored to the airbags 704 and 708, whether via one or more retraction mechanisms 716 (as shown in FIGS. 7A and 7B) or directly. Although FIG. 7A shows each of the seatbelt ends 720A, 720B, and 720C secured to a retraction mechanism 716 that is in turn secured to one of the airbags 704 and 708, in other embodiments some or all of the seatbelt ends 720A, 720B, and 720C may be secured directly to one of the airbags 704 and 708. Additionally, either the one or more retraction mechanisms 716 or a separate tightening device 714 (which may also serve as a seatbelt buckle) may be configured to retract the components of the seatbelt 712, so as to pull the airbags 704 and 708 toward each other and around an occupant of the seat 212 and thus create the enclosing/containment effect described above with respect to other embodiments of the present disclosure.

To move the anchor points of the seatbelt 712 to the airbags 704 and 708, the airbag (or component thereof) is constructed to be sufficiently anchored to the structure of the seat 212 (which in turn must be sufficiently anchored to the frame of the vehicle 100) to withstand any expected forces and to pass prescribed regulatory testing. Similarly, the airbag material, or its enclosure, must likewise be sufficiently strong enough to withstand expected forces and to pass prescribed regulatory testing.

With reference still to FIG. 7A, the airbags 704 and 708 of the universal seat-mounted airbag system 700 are shown in an initial deployed state. End 720A of the lap belt 712A is attached or otherwise secured to the airbag 704 via a retraction mechanism 716. End 720B of the lap belt 712A is attached or otherwise secured to the airbag 708 via a retraction mechanism 716. And, end 720C of the shoulder belt 712B is attached or otherwise secured to the airbag 704 via another retraction mechanism 716. The retraction mechanisms 716 are connected to the air bags 704 and 708, as appropriate, such that when the airbags 704 and 708 are not inflated, the seatbelt 712 functions normally (e.g., can restrain an occupant during a deceleration event that does not trigger inflation of the airbags 704 and 708), and when the airbags 704 and 708 are inflated, the seatbelt 712 remains secured thereto via the retraction mechanisms 716. In other embodiments, however, the seatbelt 712 may be secured directly to the airbags 704 and 708 (e.g., without use of a retraction mechanism 716), whether at one, some, or all of the ends 720A, 720B, and 720C of the seatbelt 712.

FIG. 7B shows the airbag system 700 at a later stage. Here, the retraction mechanisms 716 have retracted the seatbelt 712, thus pulling the airbags 704 and 708 toward each other so as to partially or substantially enclose an occupant thereof.

The new tether/belt hybrid system works in two phases. The first phase (corresponding to FIG. 7A) is the initial airbag deployment phase. The second phase (corresponding to FIG. 7B) is the belt tensioning phase, which draws the still inflating airbags 704 and 708 around the occupant creating the desired safety "cocoon". The first phase consists of one or more airbag inflator(s) igniting and filling the stored airbags 704 and 708, causing the airbags 704 and 708 to deploy outward, in a manner similar to a conventional frontal, side, or curtain airbag, for example. This outward motion is defined by the shape and position of the airbags 704 and 708. Given that the ends 720A, 720B, and 720C are anchored to the airbags 704 and 708 (whether directly or via one or more retraction mechanisms 716), which are expanding during the first phase, the ends 720A, 720B, and 720C move outward away from the seat structure and forward of the occupant.

After a predetermined favorable deployment time (during which time the airbags 704 and 708 may or may not achieve full deployment), the second phase initiates by way of one or more fast-acting retraction devices 716 (which may utilize, for example, a pyro-technic charge, spring-loaded release, compressed gas piston, electric motor rack and pinion, etc.) which retract one or more of the ends 720A, 720B, and 720C and thus reduce the effective length of both the lap belt 712A and the sash belt 712B of the seatbelt 712. Since the lap belt 712A and the sash belt 712B are still anchored to the deploying airbags 704 and 708, the combined motion of the airbag outward travel (notionally from beside or behind the occupant and toward the occupant-facing direction) and the inward travel of the lap belt 712A and sash belt 712B causes the airbags 704 and 708 to close in around the occupant, thus creating the intended safety containment.

The retraction mechanism(s) 712 can be any number of mechanisms that create a pull in the specified direction. An example a retraction mechanism 716 is a length of pre-loaded spring that is directly between the belt anchor and the webbing portion of the belt system. The pre-loaded spring's potential energy wants to pull it inward, but a catch prevents it from doing so. During the second phase, this catch is released via solenoid or pyro-technic charge, allowing the spring to quickly return to its shorter rest state, which reduces the effective length of the seatbelt 712. This could optionally be provided with a locking or ratcheting mechanism to limit reverse travel after deployment if advantageous for the specific application. Another retraction mechanism 716 could be a fast-acting spooling device, again located at one or more of the ends 720A, 720B, and 720C of the seatbelt 712. During the second phase, the spool would be spun backwards at sufficient speed as to cause the effective length of the seatbelt 712 to be reduced as it is wound up into the spool.

In some embodiments, only one of the ends 720A, 720B, and 720C may be secured to a retraction mechanism 716, while the remaining ends of the seatbelt 712 are secured directly to the airbags 704 or 708, as appropriate. Such embodiments beneficially reduce the cost of the system 700 (because fewer retraction mechanisms 716 are required), but the one remaining retraction mechanism 716 must retract a longer length of the seatbelt 712 to achieve the same effect as three separate retraction mechanisms 716 each retracting a shorter length of the seatbelt 712.

Also in some embodiments, each of the ends 720A, 720B, and 720C of the seatbelt 712 may be secured directly to the airbags 704 and 708, as appropriate, while a device 714 may serve as both a seatbelt buckle and as a retraction mechanism. In such embodiments, the device 714 may retract the seatbelt 712 from only one direction (e.g., may retract only the portion of the seatbelt 712 extending to the end 720A, or to the end 720B, or the end 720C), or from a plurality of directions, or from all directions (e.g., may retract the portion of the seatbelt 712 extending to the ends 720A, 720B, and 720C).

In other embodiments of the system 700, a device 714 as well as one or more retraction mechanisms 716 may be used in combination to retract the seatbelt 712 and draw the airbags 704 and 708 toward each other to form a partial or substantial enclosure of the occupant.

In some embodiments, the retraction of the seatbelt 712 by one or more retraction mechanisms 716 and/or by a device 714 may occur after inflation of the airbags 704 and 708 is complete, or during inflation of the airbags 704 and 708. In embodiments where the vehicle 100 in which the airbag system 700 is installed comprises an Occupant Classification System, the timing of the retraction of the seatbelt 712 may be varied based on information obtained by the Occupant Classification System. For example, where the Occupant Classification System determines that a small or lightweight occupant is in the seat 212, the retraction may begin more quickly than if the Occupant Classification System determines that a large occupant is in the seat 212.

Notably, because the seatbelt 712 will typically be relatively snug around an occupant of the seat 212, regardless of the occupant's size, the retraction mechanisms 716 and/or device 714 may be configured to retract the seatbelt 712 by a predetermined amount. In other embodiments, the amount of retraction may vary based on information from an Occupant Classification System and/or other available sensor information. For example, if available information indicates that a lightweight occupant is in the seat 212, but that the seatbelt 712 is extended significantly farther than normal for a lightweight occupant, then the retraction mechanisms 716 and/or the device 714 may retract the seatbelt 712 by a greater amount than if the seatbelt 712 were only extended by a typical amount for a lightweight occupant. In still other embodiments, the retraction mechanisms 716 and/or the device 714 may be configured to retract the seatbelt 712 until reaching a predetermined tension in the seatbelt 712, as measured, for example, by a sensor in one or more retraction mechanisms 716 and/or in the device 714. This latter arrangement beneficially helps to prevent excess retraction of the seatbelt 712, which could be harmful to an occupant of the seat 212.

In some embodiments, the system 700 may be used in conjunction with a universal airbag section deployable around an occupant's head (e.g., that deploys from a perimeter of a headrest 212A of the seat 212). The tensioning of the sash belt 712B could be linked to a tether system within the universal airbag head section to close the airbag around the occupant's head. In some embodiments, the system 700 may be comprise a 4-point belt, which would enable symmetric tensioning and closing of the airbags 704 and 708 around the occupant.

Figure 8:
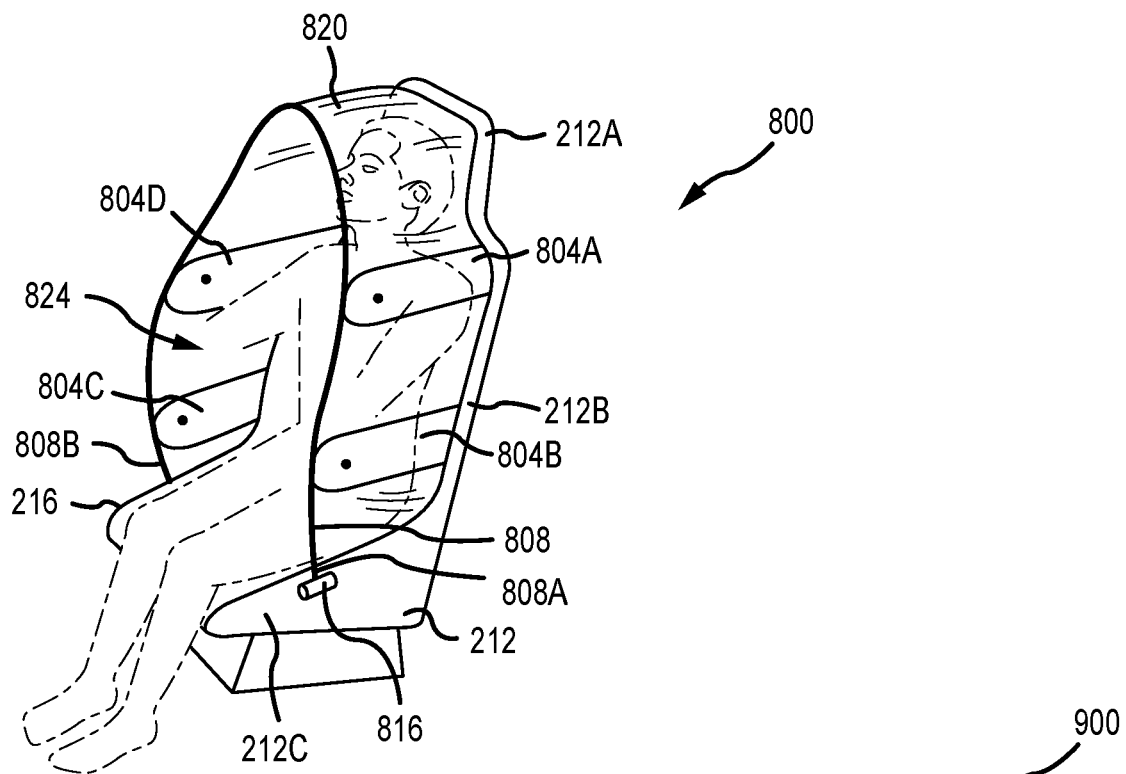
FIG. 8 shows another seat-mounted airbag in accordance with at least some embodiments of the present disclosure.

FIG. 8 shows a universal seat-mounted airbag system 800 comprising a plurality of inflation chambers 804A-804D and a non-inflatable fabric shell 820. The system 800 is shown in FIG. 8 in a deployed state. The inflation chambers 804A-804D are oriented in the deploying direction; in other words, the inflation chambers 804A-804D are (once deployed) elongated in the direction of deployment. Although the fabric shell 820 does not inflate, the inflation chambers 804A-804D cause the fabric shell 820 to deploy from a stored position along a portion of the perimeter 216 of the seat 212, and substantially support the fabric shell in the deployed position. The inflation chambers 804A-804D may be positioned in key areas (e.g., to protect key parts of the occupant's body, and/or to provide adequate support to the fabric shell 820). Utilizing only precisely-positioned inflation chambers 804A-804D rather than an entire inflatable airbag (as in the system 200, for example) may beneficially reduce the cost and complexity of the system 800, while still providing occupant containment (with the fabric shell 820) and some level of cushioning (with the inflation chambers 804A-804D).

In some embodiments, the system 800 may further comprise a tether 808. The tether 808 may simply provide static tension to the second or free edge of the fabric shell 820, similar to the tether 208 described above, or the tether 808 may function as a drawstring and be useful for reducing the size of, or closing altogether, the opening 824 formed along the second or free edge of the fabric shell 820, similar to the tether 408 described above. In the former instance, the tether 808 may comprise a first end 808A secured directly to one side of a seat pan 212C along a perimeter 216 of a seat 212, and a second end 808B secured directly to an opposite side of the seat pan 212C along the perimeter 216 of the seat 212. In the latter instance, the tether 808 may comprise a first end 808A secured to a retraction mechanism 816 that is in turn secured directly to one side of the seat pan 212C along the perimeter 216 of the seat 212, and a second end 808B secured to another retraction mechanism 816 that is in turn secured directly to the opposite side of the seat pan 212C along the perimeter 216 of the seat 212. The retraction mechanisms 816 may operate in the same manner or in a similar manner to other retraction mechanisms described herein.

Figure 9:
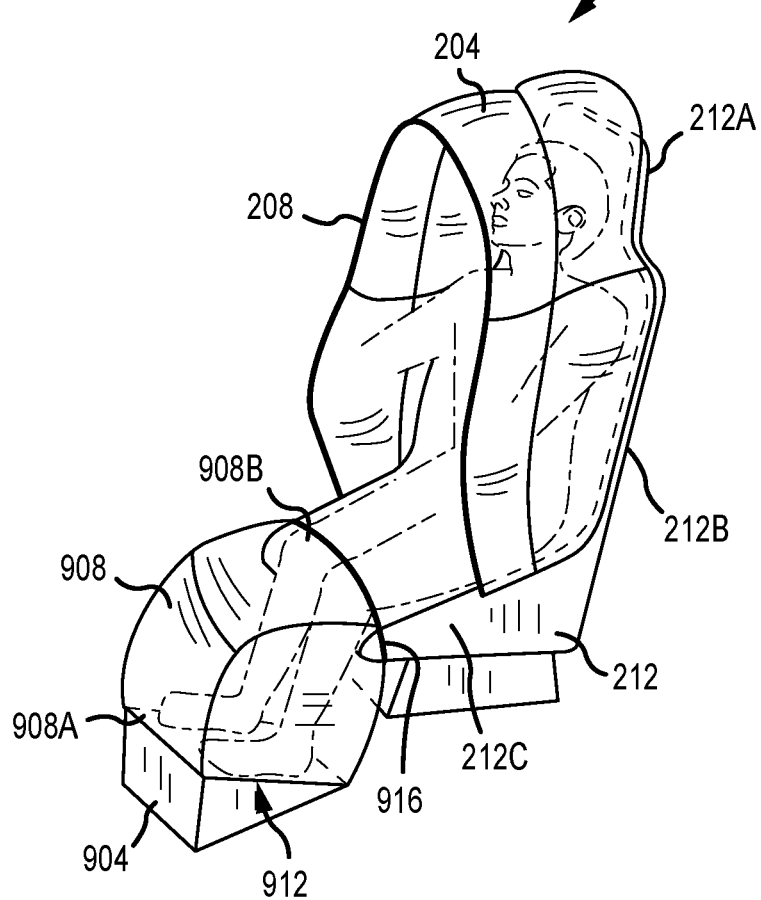
FIG. 9 shows another seat-mounted airbag in accordance with at least some embodiments of the present disclosure.
Figure 10:
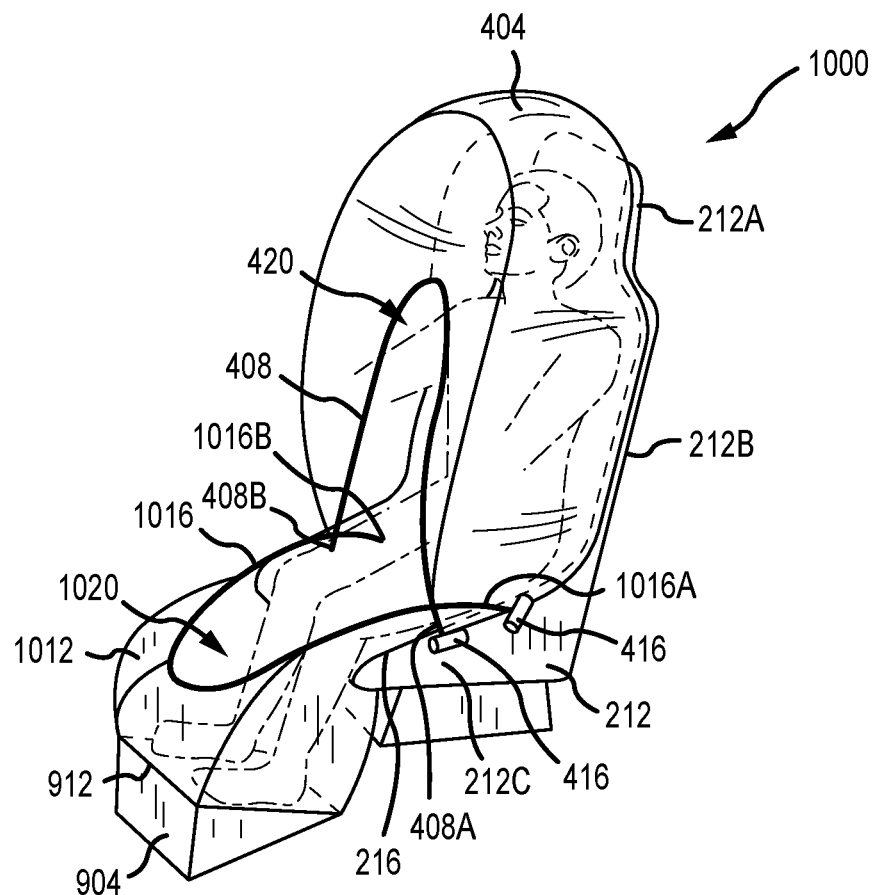
FIG. 10 shows another seat-mounted airbag in accordance with at least some embodiments of the present disclosure.

FIGS. 9-11 illustrate airbag systems that comprise foot and/or leg protection. The universal seat-mounted airbag system 900 of FIG. 9 comprises a seat 212, an airbag 204, and a tether 208, all of which have been described previously and function as described above. The system 900 also comprises, however, a footrest 904 having an upper perimeter 912, and an airbag 908 configured to deploy from at least a portion of the upper perimeter 912 so as to protect the feet and lower legs of an occupant of the seat 212. As with the other embodiments of the present disclosure described herein, the system 900 is shown with the airbags 204 and 908 in an inflated position. Normally, however, the airbag 204 is stowed within at least a portion of a perimeter of the seat 212, and the airbag 908 is stowed within at least a portion of the upper perimeter 912 of the footrest 904. As may be appreciated from the disclosure of FIG. 9, the airbag 908 comprises a first, secured edge 908A that remains connected to the upper perimeter 912 of the footrest 904 upon deployment of the airbag 908, and further comprises a second, free edge 908B that moves away from the footrest 904 upon deployment of the airbag 908. A tether 916 may be secured to the second, free edge 908B of the airbag 908, and may provide static tension along the free edge 908B.

FIG. 10 discloses a universal seat-mounted airbag system 1000 that, like the system 900, comprises a seat 212 and a footrest 904. The system 1000 further comprises an airbag 404 and a tether 408 connected at each end to a retraction mechanism 416. The airbag 404, the tether 408, and the retraction mechanisms 416 each function in the manner described above with respect to the system 400. The system 1000 still further comprises an airbag 1012 that is substantially similar to the airbag 908 of the system 900, except that a tether 1016 is engaged with the second, free edge of the airbag 1012. The tether 1016 may be attached to or otherwise engaged with the second, free edge of the airbag 1012 in any manner described herein, including by being partially enclosed within a casing or tube extending along the second, free edge; or by being threaded through a plurality of loops spaced at intervals along the second, free, edge; or in any other suitable manner. The tether 1016, like the tether 408, comprises a first end 1016A secured or otherwise connected to a retraction mechanism 416 proximate a perimeter of the seat 212 on one side of the seat pan portion 212C, and a second end 1016B secured or otherwise connected to a retraction mechanism 416 proximate a perimeter of the seat 212 on another side of the seat pan portion 212C.

During or after deployment of the airbag 1012, the retraction mechanisms 416 begin to retract the tether 1016, thus shortening the tether 1016 and drawing closed the opening 1020 formed by the second or free edge of the airbag 1012. In this manner, the system 1000 beneficially encloses the feet and lower legs of an occupant of the seat 212, thus improving protection of the occupant in a collision.

The footrest 904 of the systems 900 and 1000 may be movable from a stowed position (not shown), where the footrest is level with an interior floor of the vehicle 100, to a raised position (as illustrated). The footrest 904 may transition from the stowed position to the raised position when the backrest portion 212B of the seat 212 is reclined, or when the seat 212 is otherwise moved from a non-standard configuration.

Figure 11A:
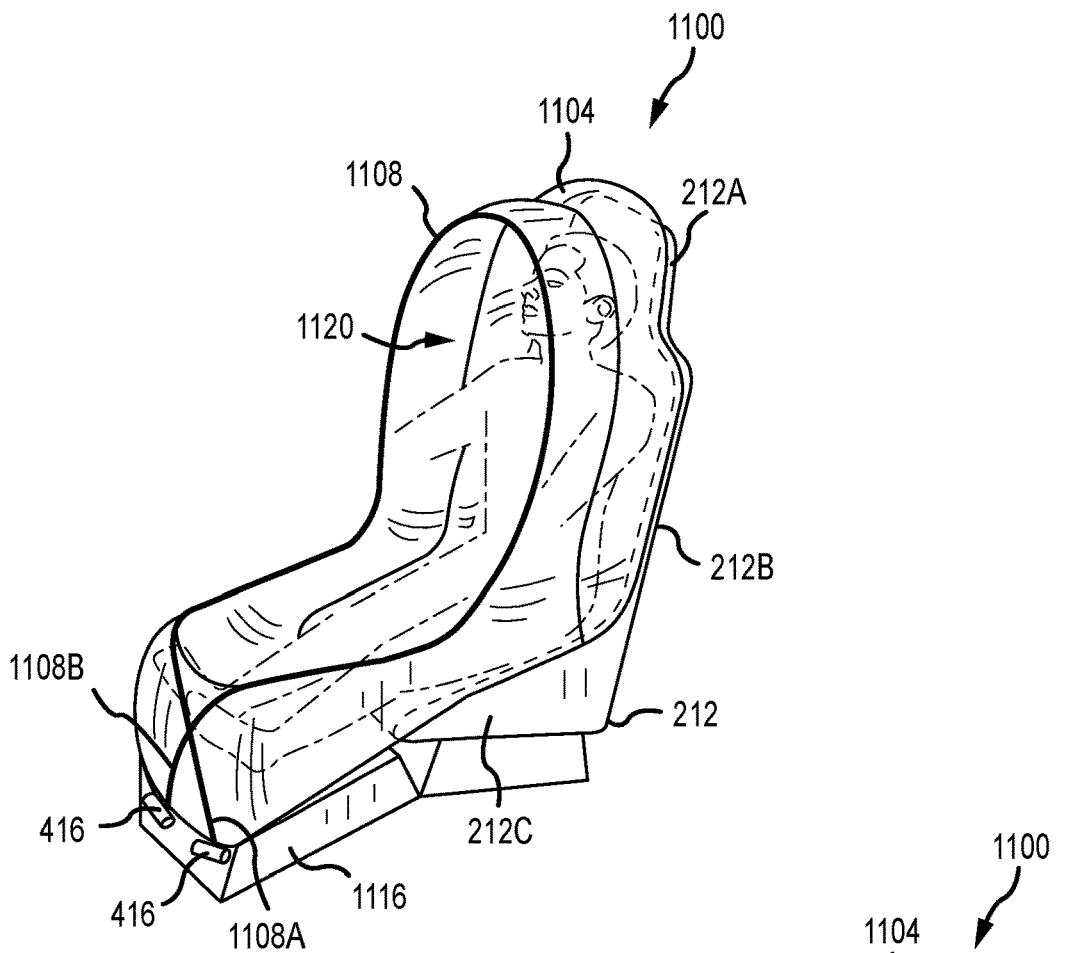
FIG. 11A shows another seat-mounted airbag in a first configuration in accordance with at least some embodiments of the present disclosure.
Figure 11B:
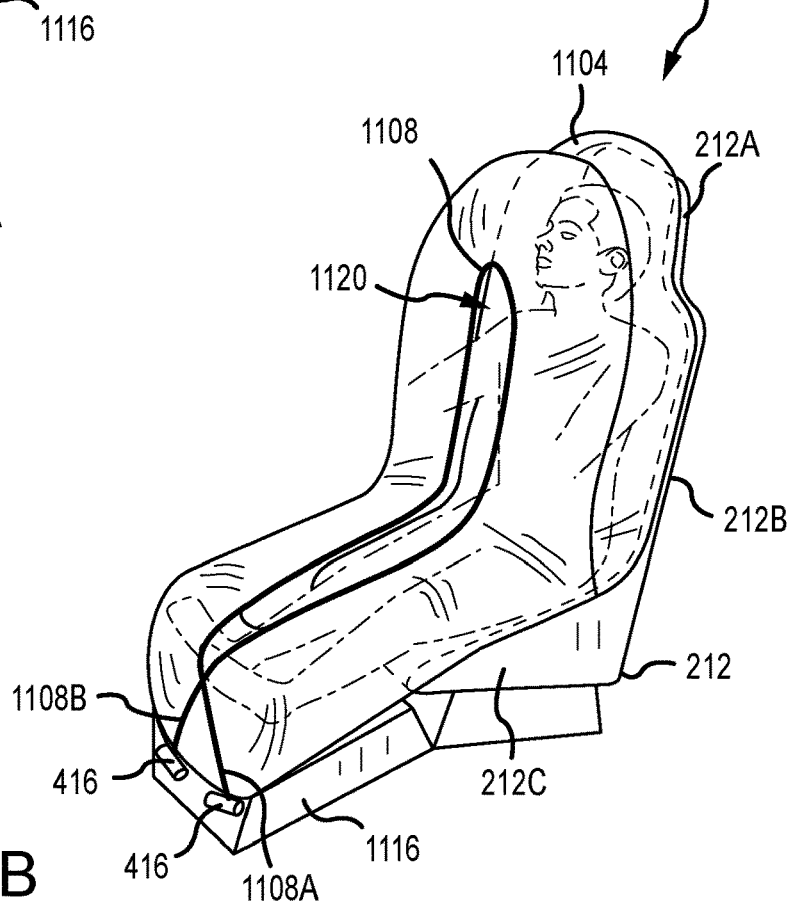
FIG. 11B shows the seat-mounted airbag of FIG. 11A in a second configuration in accordance with at least some embodiments of the present disclosure.

FIGS. 11A-11B illustrate a universal seat-mounted airbag system 1100 that, like the systems 900 and 1000, provides protection for the lower extremities of an occupant of the seat 212. The system 1100 comprises a seat 212 with a leg support 1116. Like the footrest 904, the leg support 1116 may transition from a stowed position to a raised position whenever the seat 212 is moved out of the standard configuration (e.g., when the seat 212 is reclined). The system 1100 also comprises an airbag 1104 (which may comprise a plurality of inflatable compartments or a single inflatable compartment). The airbag 1104 is stowed along an entire perimeter of the combined seat 212 and leg support 1116. As a result, the leg support 1116 must transition from a stowed position to a raised position without creating any break or gap in the airbag seam underneath which the airbag 1104 is stowed. To help prevent damage to the airbag 1104 by the movement of the leg support 1116, the airbag 1104 may be loosely packed at least at or near the joint between the leg support 1116 and the seat 212.

When a collision or other event triggers airbag deployment, the airbag 1104 deploys out of the perimeter of the seat 212 and past the occupant thereof, as illustrated in FIG. 11A. A tether 1108 extends along most or all of a second, free edge or perimeter of the airbag 1104, terminating in a first end 1108A that is secured proximate a perimeter of the leg support 1116 via a retraction mechanism 416 and in a second end 1108B that is also secured proximate a perimeter of the leg support 1116 via a retraction mechanism 416. During or after inflation of the airbag 1104, the retraction mechanisms 416 begin to retract the tether 1108, thus drawing closed the opening 1120 formed by the second, free edge of the airbag 1104 to more fully enclose the occupant within the airbag 1104, as shown in FIG. 11B. In some embodiments, one or more additional tethers may be used to assist in more fully closing the opening 1120 formed by the second, free edge of the airbag 1104.

In some embodiments, a portion of the airbag 1104 proximate the feet of the occupant (e.g., proximate the retraction mechanisms 416) comprises a reactive or stiffener element to prevent collapse of the lower portion while the tether 1108 is retracted.

Figure 12:
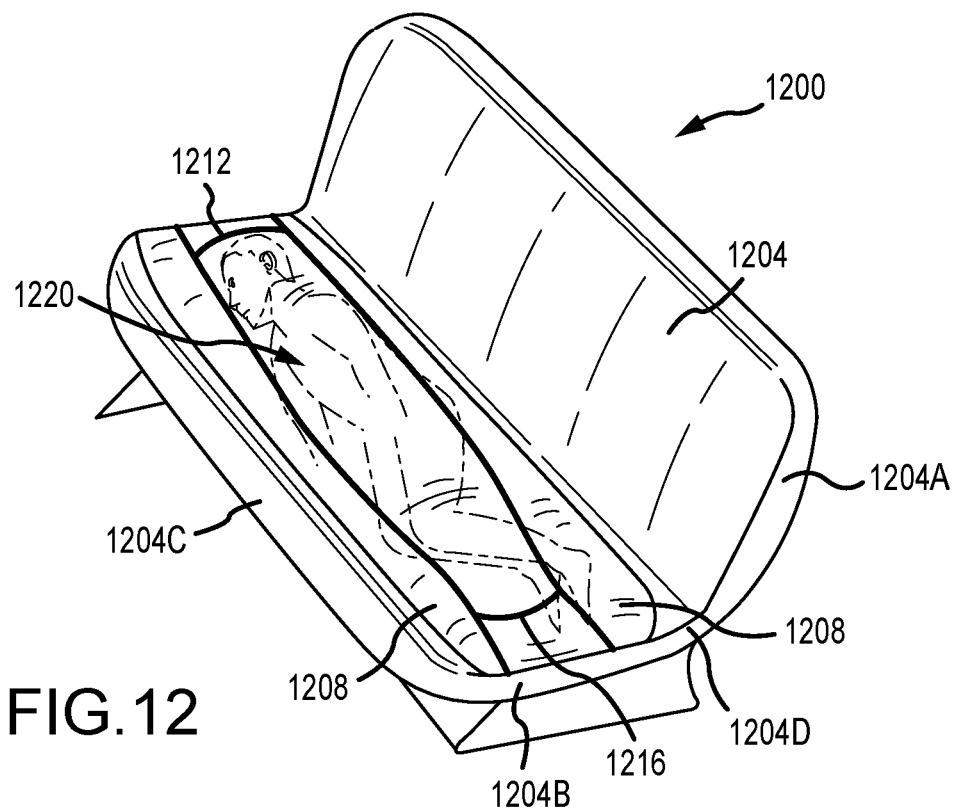
FIG. 12 shows another seat-mounted airbag in accordance with at least some embodiments of the present disclosure.
Figure 13:
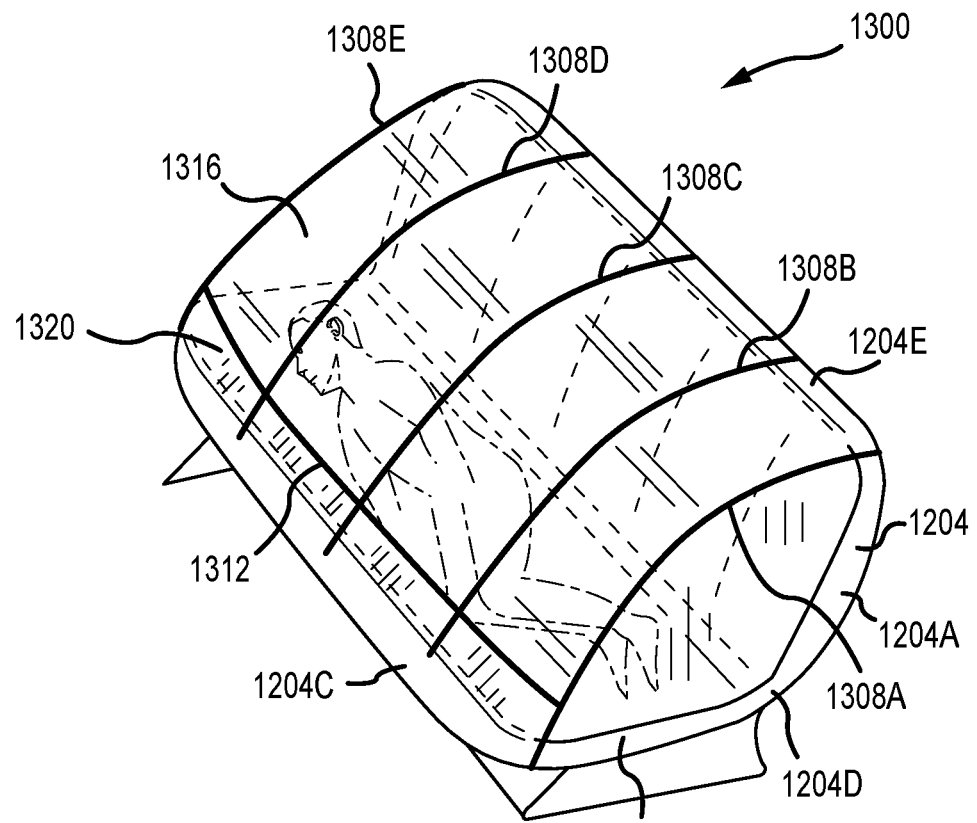
FIG. 13 shows another seat-mounted airbag in accordance with at least some embodiments of the present disclosure.

Turning now to FIGS. 12-13, the present disclosure also encompasses airbag systems for use on bench seats, to protect an occupant that is laying on the seat. FIG. 12 illustrates a universal seat-mounted airbag system 1200 installed on a bench seat 1204. The bench seat 1204 comprises a backrest 1204A, a seat bottom 1204B, a front edge 1204C, and a back edge 1204D (positioned where the seat bottom 1204B connects to the backrest 1204A). The system 1200 further comprises an airbag 1208 that deploys upward from a perimeter of the seat bottom 1204B, including the front edge 1204C and the back edge 1204D, and a plurality of tethers 1212 and 1216.

Each of the tethers 1212 and 1216 is connected to or otherwise engaged with a portion of the free edge of the airbag 1208. More specifically, the tether 1212 is connected to or otherwise engaged with the airbag 1208 proximate the front edge 1204C, one side edge of the seat bottom 1204B, and the back edge 1204D. The tether 1216 is connected to or otherwise engaged with the airbag 1208 proximate the back edge 1204D, an opposite side edge of the seat bottom 1204B, and the front edge 1204C. As a result, both ends of the tether 1212 are secured proximate one side of the seat bottom 1204B, and both ends of the tether 1216 are secured proximate an opposite side of the seat bottom 1204B.

In some embodiments, the tethers 1212 and 1216 may provide static tension to the free edge of the airbag 1208, thus helping the airbag 204 to remain in position and to limit deflection of the airbag as a result of, for example, an occupant of the seat 212 impacting an interior side of the airbag 204. The provision of static tension along the free edge of the airbag 1208 by the tethers 1212 and 1216 may also keep the airbag 1208 closer to the occupant of the seat 1204, which beneficially minimizes the motion of the occupant within the inflated airbag 1208. Further still, the tension provided by the tethers 1212 and 1216 along the free edge of the airbag 1208 helps to "capture" the occupant within the protective volume defined at least in part by the airbag 1208, by preventing the free edge of the airbag 1208 from simply moving out of the way when impacted by the occupant.

In other embodiments, the tethers 1212 and 1216 may be secured at one or both ends to a retraction mechanism such as other retraction mechanisms described herein, which may begin to retract the tethers 1212 and 1216 during or after inflation of the airbag 1208. In such embodiments, the tethers 1212 and 1216 beneficially cause the opening 1220 formed by the free edge of the airbag 1208 to become smaller or to close altogether, thus further enclosing and protecting the occupant with the airbag 1208.

FIG. 13 describes an alternative embodiment for protection of an occupant laying across a bench seat. The universal seat-mounted airbag system 1300 also protects an occupant laying across a bench seat 1204, except that the airbag 1316 of the system 1300 is stowed along at least an upper edge 1204E or the bottom edge 1204C of the seat 1204, as well as along the sides of the backrest 1204A and the seat bottom 1204B. The airbag 1316 deploys over the top and front of the occupant, so as to extend from the upper edge 1204E to the front edge 1204C, or vice versa. Tethers 1308A-1308E provide uniform tension for the airbag 1316. As may be appreciated, the tethers 1308A-1308E must be stowed along the edges of the seat 1204, and therefore must be long enough to extend from the position along the upper edge 1204E at which one end of each tether 1308A-1308E is secured, along the upper edge 1204E, the sides of the backrest 1204A and the seat bottom 1204B, and the bottom edge 1204C, to the position along the front edge 1204C at which the other end of each tether 1308A-1308E is secured. When the system 1300 deploys, one or more retraction mechanisms to which each tether 1308A-1308E is attached retracts each tether 1308A-1308E to the positions shown in FIG. 13. In some embodiments, one or more of the tethers 1308A-1308E—for example, the tethers 1308A and 1308E—may be further retracted to better enclose the occupant within the protective volume defined by the airbag 1316 and the seat 1204.

Also in some embodiments, a secondary airbag or bolster 1320 may deploy from the front edge 1204C of the seat 1204. A tether 1312 may engage a free edge of the secondary airbag or bolster 1320, which tether 1312 may extend along the free edge of the bolster 1320 (substantially parallel to the front edge 1204C of the seat 1204) and be secured either directly to the side edges of the seat 1204 (if the tether 1312 is configured to provide only static tension) or to the edges of the seat 1204 via one or more retraction mechanisms such as those described elsewhere herein (if the tether 1312 is configured to function as a drawstring).

The bolster 1320 may beneficially provide an extra barrier or additional obstacle to forward movement of the occupant from the seat 1204. The tether 1312 along the free edge of the bolster 1320 ensures that the occupant does not simply push the bolster out of the way if and when the occupant slides forward on the seat 1204 (e.g., as a result of a frontal collision of the vehicle 100).

As may be appreciated in light of the foregoing description, a full-perimeter capture system such as the airbag systems 1200 and 1300 may need more than one tether and more than one retraction mechanism to maintain appropriate tension with each tether. The retraction mechanisms may be arranged sequentially to provide uniform tensioning around the periphery. Alternatively, the retraction mechanisms may be overlapped or spaced out to provide preferential tensioning. For example, the retraction mechanisms may be spaced out to provide cupping only proximate the sides/ends of the seat 1204, or overlapped to provide extra shortening in a portion of the periphery.

Additionally, energy absorbing chambers could be integrated into the airbags 1208 and/or 1316, and/or separate side airbags could be provided in zones where an occupant's head might be located close to the side of the vehicle and thus potentially vulnerable to intrusion (e.g., in a side pole or side moving deformable barrier (MDB) crash mode).

As described above in connection with the system 1200, an adjustable or deployable bolster across the front edge 1204C of the seat 1204 may be included in the system 1300 as well. In some embodiments of the systems 1200 and 1300, the adjustable or deployable bolster may be a cushion, pad, or other non-inflatable device that is manually adjustable by a seat occupant. For example, an occupant may lay down on the seat 1204 and automatically raise the bolster at the front edge 1204C of the seat 1204. Alternatively, the bolster may rise automatically based on information determined by an Occupant Classification System or other occupant sensing system (which may comprise, for example, one or more pressure sensors, one or more optical sensors, and/or any other sensors useful for determining the position of an occupant in a seat 1204). In still further embodiments, the bolster may be inflatable and may deploy automatically when a crash impact is sensed. In any of the foregoing embodiments, the bolster provides a barrier that helps to prevent someone from rolling off of the seat 1204 and onto the floor of the vehicle 100. The universal airbag could be integrated with that bolster or it could be separate and deploy around, in front of, or above the bolster.

Figure 14:
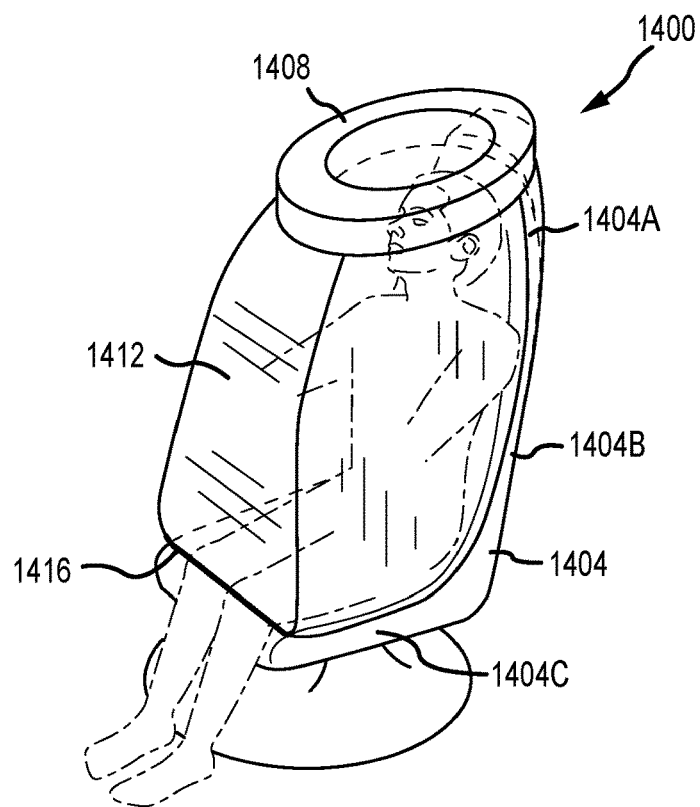
FIG. 14 shows another seat-mounted airbag in accordance with at least some embodiments of the present disclosure.

Autonomous vehicles will lead to a redesign of the interior and seats which will vary depending on the application. FIG. 14 shows a universal seat-mounted airbag system 1400 that may be used with an unconventional seat 1404 that comprises an overhead halo 1408. The halo 1408 may be secured, for example, to a headrest 1404A of the seat 1404. The overhead halo 1408 may comprise speakers for the provision of surround sound and active noise cancelling, thus helping to create an individual, more private space. The halo 1408 may further comprise, for example, one or more video screens (which may or may not be retractable), one or more lights (e.g., for reading), one or more air vents for climate control, one or more radiant heaters for climate control, one or more wireless interfaces (utilizing, e.g., Bluetooth, WiFi, or any other wireless communications protocol) for communicating with smartphones, tablets, wireless headphones, or other wireless-enabled computing devices; and one or more jacks for connecting and/or charging electronic devices (e.g., an audio jack, a USB jack, an HDMI jack, a Firewire jack, a Lightning jack).

The halo 1408 may further comprise a stowed airbag 1412 that, when deployed (as illustrated in FIG. 14), substantially encloses an occupant of the seat 1404. For example, the airbag 1412 may deploy to the front and sides of an occupant of the seat 1404, such that the airbag 1412 together with the seat 1404 enclose the occupant on all sides. In some embodiments, a tether 1416 may engage the lower, free end of the airbag 1412. The tether 1416 may have a first end secured to a side of the seat 1404 proximate the lower end of the backrest 1404B of the seat 1404 (proximate the seat bottom 1404C), and may have a second end secured to an opposite side of the seat 1404 proximate the lower end of the backrest 1404B of the seat 1404. When the airbag 1412 is in the stowed position, the tether 1416 may also be stowed along a portion of the perimeter of the seat extending from the anchor points of the ends of the tether 1416 up to and around the halo 1408. Then, when the airbag 1412 deploys, the tether 1416 may rip through a tear seam or rip seam along the perimeter of the seat 1404. The ends of the tether 1416 may be secured to the seat 1404 via one or more retraction mechanisms, which during or after inflation of the airbag 1412 may begin to retract the tether 1416 until it is taught. Use of a tether 1416 in this manner beneficially prevents the airbag 1412 from simply sliding off of the occupant as the occupant moves out of the seat 1404 (e.g., during a collision).

Figure 15:
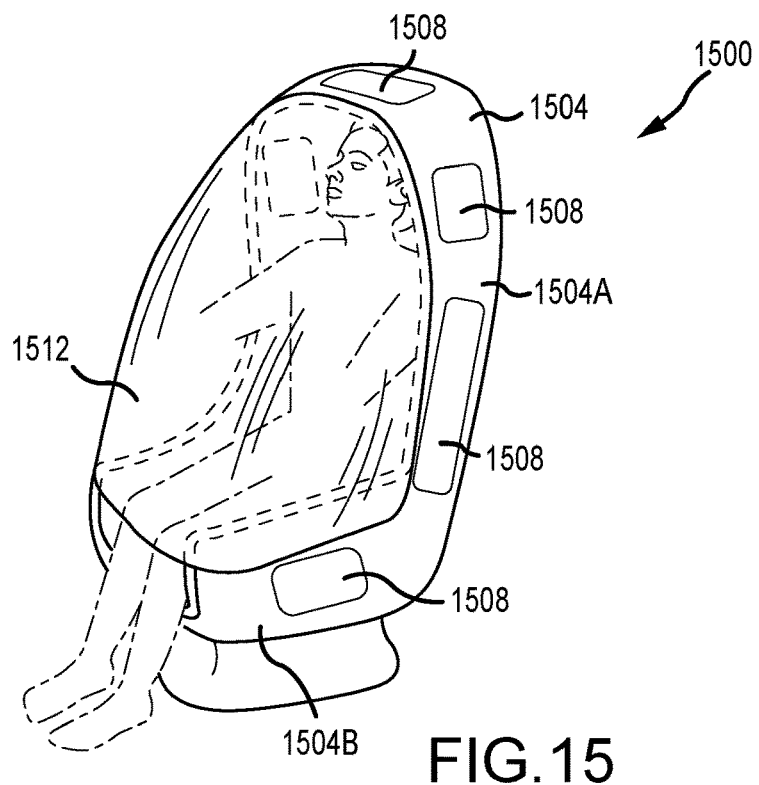
FIG. 15 shows another seat-mounted airbag in accordance with at least some embodiments of the present disclosure.

With respect now to FIG. 15, a universal seat-mounted airbag system 1500 is used in conjunction with another unconventional seat 1504. The seat 1504 is pod-like in that the sides of a backrest 1504A of the seat 1504 extend forward and the sides of a bottom 1504B of the seat 1504 extend upward, thus partially enclosing the occupant. The system 1500 comprises a primary airbag 1512 that, when triggered, deploys from the extended sides of the seat 1504 over the front of the occupant. As with the system 1400, a tether may be engaged with, for example, a lower free edge of the airbag 1512 to prevent the airbag from simply sliding off of the occupant of the seat 1504 as the occupant moves forward due to a collision or other airbag-triggering event.

Additionally, the system 1500 comprises a plurality of smaller airbags or bolsters 1508 positioned at key locations on the seat 1504, for example to protect the head, torso, and upper legs of an occupant by expanding into the space in between the sides of the seat 1504 and the occupant to limit the occupant's movement during a collision or other airbag-triggering event, and thus improve occupant safety.

Embodiments of the present disclosure, including any or all of the embodiments specifically described herein, may comprise one or more of the following features.

The fabric from which airbags described herein are made may provide some air permeability, pass-through/venting holes or apertures, or other airflow feature so that when the airbag is drawn closed, the restrained occupant can still breathe adequately without suffocation. In some embodiments, an airbag or portion thereof located near a headrest or otherwise configured to be adjacent an occupant's head may comprise some air permeability, pass-through/venting holes or apertures, or other airflow feature, while an airbag or portion thereof that is positioned away from a headrest or otherwise configured not to be adjacent an occupant's head may not comprise any air permeability, pass-through/venting holes or apertures, or other airflow feature. In embodiments of the present disclosure comprising sections of non-inflated or non-inflatable fabric secured to one or more airbags, the sections of non-inflated or non-inflatable fabric may comprise air permeability, pass-through/venting holes or apertures, or another airflow feature, while the one or more airbags to which such sections of fabric are secured may not.

One or more occupant access features may also be provided, whether to allow emergency personnel or other rescuers access to an occupant protected by the deployed universal seat-mounted airbag system and/or to facilitate occupant egress or extraction following deployment of the universal seat-mounted airbag system. In some embodiments, an access panel may be provided in the upper portion of the airbag. For example, a flap integrated within the inflatable portion of an airbag may be provided, which flap can be opened (e.g., via a rip seam, Velcro tabs, etc.) from the interior or the exterior of the airbag, to provide visual contact with the occupant and/or to allow the occupant to view the external environment.

In other embodiments, an interior release mechanism may be integrated into the universal airbag system. For example, an airbag may comprise a pull cord with graphical instructions printed on an interior of the bag (so as to be visible to an occupant when the airbag is inflated), which pull cord, when pulled, releases the airbag from the structure to which it is attached.

In still other embodiments, an exterior release mechanism may be integrated into the universal seat-mounted airbag system, which may be operable to release the airbag from the structure to which it is attached.

Universal airbag systems according to embodiments of the present disclosure may further be configured such that when the inflated airbag(s) are drawn closed by a tether, drawstring, or otherwise, there is room for an occupant's head to translate a favorable amount instead of being tightly held. This extra internal volume may initially be held in a smaller-volume configuration and then released into a larger-volume configuration. For example, an airbag may comprise stitching that can tear or will otherwise be mechanically released under a calibrated load, or that may be electronically released at a calibrated time or in coordination with a separately monitored or calculated event, to provide an energy absorbing transition from the smaller-volume configuration to the larger-volume configuration. One or more fabric panels may be utilized to enable such functionality.

Universal airbag systems according to the present disclosure may also be configured with one or more inflation chambers that surround the head, neck, and shoulders to mimic a head-and-neck support (HANS) device and limit head and neck movement while constraining shoulder movement. Similarly, an additional chamber may be provided so as to selectively fill otherwise free volume within the containment and thereby favorably control occupant kinematics in the pelvic region. These inflation chambers may be built into an airbag of the universal seat-mounted airbag system or may be or comprise a separate seat-mounted airbag system that works in conjunction with the universal seat-mounted airbag system.

Embodiments of the present disclosure may allow for selective deployment with secondary inflation based on Occupant Classification System (OCS) data. Depending on the volume the occupant occupies, secondary inflation can control for extra supplemental inflation and reduce the interior volume surrounding the occupant for better occupant kinematics control and energy absorption functionality.

Any of the retraction mechanisms described herein may be configured to retract a tether connected thereto only until a certain load or tension is reached, so as to avoid inadvertently causing harm to an occupant by over-retracting the tether. Additionally, the retraction mechanisms may be configured to operate differently depending on the orientation of the impact that triggers airbag deployment. For example, a retraction mechanism may be configured to provide full retraction (e.g., retraction up to a predetermined load level, or retraction of a predetermined length of tether) when the impact occurs from the front, and partial or no retraction when the impact occurs from the side, or vice versa, depending on how the use of retraction will best protect the occupant.

In any of the embodiments described herein, a "reactive" tether may be provided at or near the opening of a casing or tube (or at one or more points along the length of the casing or tube) through which the tether of a given embodiment (the "primary" tether) extends. The reactive tether may be provided to counteract the pulling force caused by the primary tether of the given embodiment through friction or other loading (for example, by preventing stretching of the casing or tube), for enhanced drawstring closure/capture action. More specifically, the reactive tether provides additional support to the surrounding material around the origin of the casing or tube through which the primary tether extends, as the primary tether retracts. Simple retraction of a primary tether can potentially pull the surrounding material in the direction of retraction. The reactive tether reacts in the opposite direction to maintain the integrity of the surrounding material and hold the surrounding material in place to improve the cinching effect of the primary tether.

This feature is an optional addition to the embodiments described herein, and if used may improve the effectiveness of a given embodiment in certain applications. The reactive tether may be a separate piece only connected at the casing or tube, or may be attached to the deploying material at one or more points, or may be an integral reinforcement in the deploying material, or may just be the deploying material itself oriented in a way as to provide a reactive action on the casing or tube. Instead of a reactive tether, a reaction tube (brace, strut, support, etc.) may be optionally provided for the same purpose, except that it acts in a pushing direction. The drawstring may be routed through the reaction tube or outside of it. If routed through the reaction tube, the tube may be attached at one or more points to a supporting structure or the deploying material, or optionally may be left free to move with the drawstring until it moves and abuts a supporting surface or the surface/structure that the drawstring emerges from and is retracted into.

The universal seat-mounted airbag systems disclosed herein may be integrated into a fixed back seat or a seat with a reclining, movable seatback. In some embodiments, an airbag used in these systems may be one continuous airbag that attaches from the seat back to the seat pan. The airbag can also be separated into a seat back portion and seat pan portion with attaching fabric or tethers to allow for seat recline. The attachments or tethers can be flexible, and/or the deploying material can be flexible, and routed adjacent to the pivot point between the seat back and the seat pan to allow the seatback to recline without requiring lengthening or shortening during that movement. In either case, whether integrated with a fixed back seat or a seat with a reclining, movable seatback, the universal airbag can be attached to a secondary structure which is fixed to or follows the seat structure through its range of adjustments or is stationary with the provision that the deploying material size is selected to accommodate any additional deployment range requirement.

Any of the tethers described herein may comprise, for example, a cord, a rope, or a strap. In some embodiments, where use of a cord or rope may be potentially harmful (e.g., due to edge loading along a narrow line of contact), a wider strap providing a greater area over which forces may be distributed may be preferable. The tethers described herein may also comprise a mesh or other non-linear construction, provided that the tether may be secured to or otherwise engaged with an airbag as disclosed herein.

One or more processors, configured to executed instructions stored in computer memory, may be utilized to control operation of any of the airbag systems disclosed herein. The instructions may be configured to receive one or more inputs from an Occupant Classification System or from one or more sensors not associated with an Occupant Classification System; to make a determination regarding airbag deployment and tether tensioning based on the received input(s); and to transmit one or more signals to a universal seat-mounted airbag system to control deployment thereof.

Universal seat-mounted airbag systems according to embodiments of the present disclosure may be capable to capture an occupant of a vehicle seat to keep the occupant from traveling in an unrestrained trajectory, and may further comprise an energy absorption capability, whether through inflation/controlled deflation or an enclosed cavity, or through controlled translation. These capabilities may be provided independently or jointly. In some embodiments, the capture capability may enable redirection of the position of an occupant's limb (e.g., an arm or a leg), especially if a significant portion of the remainder of the occupant's body (e.g., head and torso) is already capture. For example, if an occupant's hand and/or arm are extended through an open window, the ability of an airbag system as disclosed herein to redirect the hand and/or arm inside the vehicle and within an airbag could prevent the hand and/or arm from being crushed if the vehicle were in a collision that caused the vehicle to roll over.

The ability of universal seat-mounted airbag systems according to embodiments of the present disclosure to capture and restrain an occupant is unique, as an occupant can simply bounce off of traditional airbags. Moreover, seatbelts are useful for restraining occupants, but are pre-deployed (e.g., must be buckled across the occupant to provide protection), while embodiments of the present disclosure deploy only in the event of a collision.

Notably, the airbags used in embodiments of the present disclosure need not be deployed fully beyond an occupant to capture the occupant. As long as the airbag is deployed past the occupant's center of mass (in a direction perpendicular to the occupant's direction of travel), then the occupant's momentum will carry the occupant toward/into the airbag rather than away from/out of the airbag.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include an airbag system comprising: an airbag deployable from a stowed position to an inflated position, the airbag comprising: a connected edge secured along a portion of a perimeter of a vehicle seat; and a free edge spaced from the perimeter of the vehicle seat when the airbag is in the inflated position; and a tether connected to the airbag along the free edge, the tether under tension when the airbag is in the inflated position.

Aspects of the above airbag system include: wherein vehicle seat comprises a pan portion and a back portion, the back portion comprising a first side, a second side, and an upper edge extending between the first side and the second side; wherein the portion of the perimeter of the vehicle seat is defined by the first side, the upper edge, and the second side; wherein the tether comprises a first end secured to a first edge of the pan portion and a second end secured to a second edge of the pan portion, the first edge opposite the second edge; wherein the tether is fixedly secured to the second edge; wherein the airbag comprises a plurality of loops secured to the free edge, and the tether extends through the plurality of loops; a retraction mechanism secured to the pan portion, the retraction mechanism further secured to an end of the tether and configured to partially retract the tether; a second tether connected to the airbag, the second tether having a one end secured proximate a first edge of the pan portion and another end secured proximate a second edge of the pan portion, the first edge opposite the second edge; a plurality of tether straps, each tether strap of the plurality of tether straps having a first end secured to the second tether or the airbag and a second end secured proximate the first side or the second side; wherein the second end of each tether strap is secured to a retraction mechanism configured to partially retract the tether strap when the airbag is in the inflated position; and wherein the second end of each tether strap is secured to an extension mechanism configured to partially extend the tether strap when the airbag is in the inflated position.

Embodiments also include a vehicle comprising: a vehicle seat comprising a headrest portion, a back portion, and a bottom portion; an upper airbag stowed along a continuous section of an outer perimeter of the vehicle seat; and an upper airbag tether having a first end secured on a first side of the bottom portion and a second end secured on a second side of the bottom portion opposite the first side, the upper airbag tether attached to an edge of the upper airbag.

Aspects of the above vehicle include: wherein the first end is secured by a first retraction mechanism and the second end is secured by a second retraction mechanism, the first and second retraction mechanisms configured to retract the first and second ends when the upper airbag is deployed; further comprising: a footrest positioned adjacent the bottom portion and a lower airbag configured to deploy over the footrest and toward the vehicle seat; a lower airbag tether having a third end secured on the first side and a fourth end secured on the second side, the lower airbag tether attached to an edge of the lower airbag; wherein the third end is secured by a third retraction mechanism and the fourth end is secured by a fourth retraction mechanism, the third and fourth retraction mechanisms configured to retract the third and fourth ends when the upper airbag is deployed; and wherein the continuous section of the outer perimeter is defined in part by each of the bottom portion, the back portion, and the headrest portion.

Embodiments further include a vehicle comprising: a seat comprising a bottom portion and a backrest portion extending upward proximate a rear edge of the bottom portion; and an airbag system deployable from a stowed position to an inflated position, the airbag system comprising at least one of: a first airbag stowed within a halo positioned above the bottom portion, the first airbag configured to inflate downward from the halo toward the bottom portion; a second airbag stowed along a front edge of the bottom portion, the second airbag configured to inflate upward from the bottom portion; a seatbelt having a first anchor point on a first side airbag stowed within a first side edge of the bottom portion and a second anchor point on a second side airbag stowed within a second side edge of the bottom portion opposite the first side edge, wherein inflation of the first side airbag and the second side airbag causes each of the first anchor point and the second anchor point to move relative to the bottom portion; or at least one third airbag stowed within an edge of the bottom portion and at least one fourth airbag stowed within an edge of the side portion, wherein the edge of the bottom portion extends upward and the edge of the side portion extends forward to form a partial enclosure.

Aspects of the above vehicle include: wherein the airbag system, when deployed, and the seat are positioned to substantially surround an occupant of the seat in at least one plane.

Embodiments further include an airbag assembly comprising: a housing; an airbag configured to deploy from a stowed position to an inflated position, the airbag comprising a first elongated edge secured to the housing and a second elongated edge not secured to the housing; and a drawstring attached to the second elongated edge.

Aspects of the above airbag assembly include: wherein the airbag comprises a first chamber adjacent the first elongated edge and a second chamber adjacent the second elongated edge, the first chamber configured to inflate before the second chamber when the airbag deploys.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The terms "memory" and "computer-readable memory" are used interchangeably and, as used herein, refer to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable medium is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJ-S™ processors. A processor as disclosed herein may perform computational functions using any known or future-developed standard, instruction set, libraries, and/or architecture.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example,"

"by way of example," "e.g.," "such as," or similar language) is not intended to and does not limit the scope of the present disclosure.

What is claimed is:

1. An airbag system comprising:
   an airbag deployable from a stowed position to an inflated position, the airbag comprising:
   a connected edge secured along a portion of a perimeter of a vehicle seat; and
   a free edge spaced from the perimeter of the vehicle seat when the airbag is in the inflated position; and
   a tether connected to the airbag along the free edge, the tether under tension when the airbag is in the inflated position.

2. The airbag system of claim 1, wherein the vehicle seat comprises a pan portion and a back portion, the back portion comprising a first side, a second side, and an upper edge extending between the first side and the second side.

3. The airbag system of claim 2, wherein the portion of the perimeter of the vehicle seat is defined by the first side, the upper edge, and the second side.

4. The airbag system of claim 2, wherein the tether comprises a first end secured to a first edge of the pan portion and a second end secured to a second edge of the pan portion, the first edge opposite the second edge.

5. The airbag system of claim 4, wherein the tether is fixedly secured to the second edge.

6. The airbag system of claim 1, wherein the airbag comprises a plurality of loops secured to the free edge, and the tether extends through the plurality of loops.

7. The airbag system of claim 2, further comprising:
   a retraction mechanism secured to the pan portion, the retraction mechanism further secured to an end of the tether and configured to partially retract the tether.

8. The airbag system of claim 2, further comprising a second tether connected to the airbag, the second tether having one end secured proximate a first edge of the pan portion and another end secured proximate a second edge of the pan portion, the first edge opposite the second edge.

9. The airbag system of claim 8, further comprising a plurality of tether straps, each tether strap of the plurality of tether straps having a first end secured to the second tether or the airbag and a second end secured proximate the first side or the second side.

10. The airbag system of claim 9, wherein the second end of each tether strap is secured to a retraction mechanism configured to partially retract the tether strap when the airbag is in the inflated position.

11. The airbag system of claim 9, wherein the second end of each tether strap is secured to an extension mechanism configured to partially extend the tether strap when the airbag is in the inflated position.

12. A vehicle comprising: a vehicle seat comprising: a headrest portion; a back portion; and a bottom portion; an upper airbag stowed along a continuous section of an outer perimeter of the vehicle seat; and an upper airbag tether having a first end secured on a first side of the bottom portion and a second end secured on a second side of the bottom portion opposite the first side, the upper airbag tether attached to an edge of the upper airbag.

13. The vehicle of claim 12, wherein the first end is secured by a first retraction mechanism and the second end is secured by a second retraction mechanism, the first and second retraction mechanisms configured to retract the first and second ends when the upper airbag is deployed.

14. The vehicle of claim 12, further comprising: a footrest positioned adjacent the bottom portion; and a lower airbag configured to deploy over the footrest and toward the vehicle seat.

15. The vehicle of claim 14, further comprising: a lower airbag tether having a third end secured on the first side and a fourth end secured on the second side, the lower airbag tether attached to an edge of the lower airbag.

16. The vehicle of claim 15, wherein the third end is secured by a third retraction mechanism and the fourth end is secured by a fourth retraction mechanism, the third and fourth retraction mechanisms configured to retract the third and fourth ends when the upper airbag is deployed.

17. The vehicle of claim 12, wherein the continuous section of the outer perimeter is defined in part by each of the bottom portion, the back portion, and the headrest portion.

18. A vehicle comprising:
   a seat comprising a bottom portion and a backrest portion extending upward proximate a rear edge of the bottom portion; and
   an airbag system deployable from a stowed position to an inflated position, the airbag system comprising at least one of:
   a first airbag stowed within a halo positioned above the bottom portion, the first airbag configured to inflate downward from the halo toward the bottom portion;
   a second airbag stowed along a front edge of the bottom portion, the second airbag configured to inflate upward from the bottom portion;
   a seatbelt having a first anchor point on a first side airbag stowed within a first side edge of the bottom portion and a second anchor point on a second side airbag stowed within a second side edge of the bottom portion opposite the first side edge, wherein inflation of the first side airbag and the second side airbag causes each of the first anchor point and the second anchor point to move relative to the bottom portion; or
   at least one third airbag stowed within an edge of the bottom portion and at least one fourth airbag stowed within an edge of a side portion, wherein the edge of the bottom portion extends upward and the edge of the side portion extends forward to form a partial enclosure.

19. The vehicle of claim 18, wherein the airbag system, when deployed, and the seat are positioned to substantially surround an occupant of the seat in at least one plane.

* * * * *